United States Patent
Zusman et al.

[19]

[11] Patent Number: 5,987,432
[45] Date of Patent: Nov. 16, 1999

[54] FAULT-TOLERANT CENTRAL TICKER PLANT SYSTEM FOR DISTRIBUTING FINANCIAL MARKET DATA

[75] Inventors: Joseph Zusman, Sherman Oaks; Jennifer L. Tang, Canoga Park; Raymond S. Nakelsky, Los Angeles; Stephen L. Verbeck, Lake Forest; David Azizian, West Los Angeles, all of Calif.

[73] Assignee: Reuters, Ltd., London, United Kingdom

[21] Appl. No.: 08/998,983

[22] Filed: Dec. 29, 1997

Related U.S. Application Data

[63] Continuation of application No. 08/269,232, Jun. 29, 1994, abandoned.

[51] Int. Cl.$^6$ .................................................. G06F 17/60
[52] U.S. Cl. ............................ 705/35; 705/37; 709/260
[58] Field of Search .................................. 705/35, 36, 37, 705/1; 707/10, 104; 380/49; 395/500.44, 500.48; 709/247, 260; 370/242, 216

[56] References Cited

U.S. PATENT DOCUMENTS

| | | |
|---|---|---|
| 3,082,402 | 3/1963 | Scantlin . |
| 3,513,442 | 5/1970 | Sieracki . |
| 3,611,294 | 10/1971 | O'Neill et al . |
| 3,689,872 | 9/1972 | Sieracki . |
| 4,473,824 | 9/1984 | Clayton . |
| 4,554,418 | 11/1985 | Toy . |
| 4,566,066 | 1/1986 | Towers . |
| 4,665,519 | 5/1987 | Kirchner et al. . |
| 4,674,044 | 6/1987 | Kalmus et al. . |
| 4,677,434 | 6/1987 | Fascenda . |
| 4,677,552 | 6/1987 | Sibley, Jr. . |
| 4,868,866 | 9/1989 | Williams, Jr. . |
| 4,942,616 | 7/1990 | Linstroth et al. . |
| 4,989,141 | 1/1991 | Lyons et al. . |
| 5,038,284 | 8/1991 | Kramer . |
| 5,045,848 | 9/1991 | Fascenda . |
| 5,101,353 | 3/1992 | Lupien et al. . |
| 5,119,465 | 6/1992 | Jack et al. . |
| 5,131,020 | 7/1992 | Liebesny et al. . |
| 5,303,149 | 4/1994 | Janigian . |
| 5,557,780 | 9/1996 | Edwards et al. . |
| 5,710,889 | 1/1998 | Clark et al. . |
| 5,774,878 | 6/1998 | Marshall . |
| 5,864,827 | 1/1999 | Wilson . |
| 5,870,719 | 2/1999 | Martizen et al. . |
| 5,893,079 | 4/1999 | Cwenar . |

*Primary Examiner*—Robert A. Weinhardt
*Attorney, Agent, or Firm*—Baker & Maxham

[57] ABSTRACT

A central ticker plant system for distributing financial market data that receives ticker feed data from many exchanges throughout the world, processes and formats the received data and then distributes or broadcasts the data to regional customers in the form of securities transactional data denoting the security identity and related transactional data. The central ticker plant system is fault-tolerant because of novel hardware redundancy and multi-thread software processing architecture and operates continuously during hardware and software maintenance and repair, ensuring that every financial market data message received from the exchanges is included within 500 milliseconds in broadcast output.

18 Claims, 12 Drawing Sheets

SYSTEM CONTROL DATA FLOW

FAULT-TOLERANT CENTRAL TICKER PLANT SYSTEM FOR DISTRIBUTING FINANCIAL MARKET DATA

This application is a continuation of Ser. No. 08/269,232, now abandoned, filed Jun. 6, 1994.

BACKGROUND OF THE INVENTION

1. Field of the Invention

This invention relates generally to financial market data processing systems and specifically to a fault-tolerant computer-implemented system for assembling world-wide financial market data for regional distribution.

2. Discussion of the Related Art

The continuous reporting from the major exchanges (e.g., New York Stock Exchange, Chicago Board of Options Exchange, et al.) of financial market data such as stock trades, option premiums, securities transaction volume and the like, is denominated in the art as the "ticker data feed", which normally includes transaction price and volume data associated with a trade keyed to a "ticker symbol" representing the security traded. Ticker feed data are created when a trade is actually made on the floor of the exchange. As such, the ticker data feed includes only the raw trading information reported by floor brokers and does not usually include derivative financial data such as accumulated volume, price extremes over selected time intervals, statistical trends, and consolidated data for securities traded on several independent exchanges. Moreover, the ticker data feed is unresponsive to requests for current financial market data for specific securities, which are available only from some database in which the ticker feed data are stored and updated.

Recent advances in telecommunications technology have encouraged the proliferation of world-wide trading of securities through regional exchanges and through "virtual" exchanges that exist only in the amalgamation of computer systems denominated "cyberspace". This proliferation has given rise to new problems for the securities trader, such as fragmented markets for single securities, continuous 24-hour daily trading activity, and rapid market response to world-wide events. These new problems add to the long-felt problems in the art arising from delayed availability of derivative financial market data, individual portfolio valuation data and specific trading activity indicators or alarms. Although the effects of improved telecommunication technology operate to improve reporting of financial market data, they also exacerbate the effects of existing obstacles to the rapid collection, integration and distribution of world-wide financial market data.

Although the present art is replete with systems and procedures for the collection, assembly, processing, storage and distribution of financial market data, the existing techniques neither anticipate nor solve the newer problems arising from rapid escalation of world-wide security trading on many different physical and virtual exchanges. For instance, tens of thousands of different financial instruments are traded on several dozen physical and virtual exchanges in the United States alone. In addition, several thousand mutual fund shares are traded in the United States alone. Thousands of additional financial instruments are traded on many dozens of other exchanges in Europe and the Far East. Other exchanges include Canadian, Mexican, South American, virtual government bond markets, etc. There is a market wherever a trade is made that generates financial market data of interest to the securities trader. Because financial market data accuracy and timeliness are directly quantifiable in monetary terms, there is a clearly-felt need in the art for a financial market data reporting system that collects world-wide security trading data wherever available and delivers such data in consolidated derivative form to regional users without failures such as error or delay.

Because of the directly-quantifiable monetary value of financial market data quality, the art is replete with systems and procedures proposed by practitioners to overcome the accuracy and timeliness problems associated with reporting financial market data. For instance, in U.S. Pat. No. 4,677,552, H. C. Sibley, Jr., discloses an automated international commodity trade exchange having several local computerized trade exchanges located in at least two different countries and interconnected by satellite communication. Sibley's invention provides consolidated market data to the trader by means of user terminals, thereby permitting trades based on knowledge of the consolidated market instead of the local market. However, Sibley does not consider the collection, processing and distribution of data from scores of world-wide exchanges trading in tens of thousands of different securities involving hundreds of financial instrument types other than commodity contracts.

Other practitioners have disclosed improvements in local trading systems. For instance, in U.S. Pat. No. 5,101,353, William A. Lupien et al. disclose an automated system for improving market liquidity through computer-implemented trading apparatus. Their system uses data processing equipment to place trading orders in external securities markets and through automated "brokers" (in cyberspace) that execute trades directly between system users. Lupien et al. consider solutions to the external market liquidity problems arising from large institutional trades and do not consider the collection and distribution of world-wide financial market data. Similarly, in U.S. Pat. No. 4,674,044, Leslie P. Kalmus et al. disclose an automated securities trading system that operates as a "virtual" trading floor for selected securities. Their system reports executed trade details to the customer and to national stock price reporting systems and responds to changes in security trading prices by updating all relevant internal parameters. Kalmus et al. provide a solution to the automated trade-quality problem known for virtual exchanges but neither consider nor suggest methods for rapid and accurate accumulation of world-wide exchange transaction data for distribution to regional users. Also, in U.S. Pat. No. 5,038,284, Robert M. Kramer discloses a method and apparatus for conducting trading transactions in a network of portable trading stations. Kramer teaches a computer-assisted "pit" trading system that uses portable computer terminals to automatically report and reconcile all trades without the usual risk of confusion or error associated with the loud and boisterous "pit" environment of commodity exchange floors.

Some practitioners propose solutions to the "derivative market data" distribution problem, otherwise denominated the "portfolio tracking" problem in financial market data systems. For instance, in U.S. Pat. No. 4,989,141, Richard J. Lyons et al. disclose a computer system for financial analysis and reporting of individualized market portfolio performance. Lyons et al. ignore the problem of accurate trading reports. Similarly, in U.S. Pat. No. 4,566,066, Frederic C. Towers discloses a securities valuation system that employs a general purpose digital computer to produce securities portfolio valuation schedules for many simultaneous users. Like Lyons et al., Towers merely assumes accurate daily updates to the basic financial market data without considering the above-described quality problems.

More pertinently to the global financial data quality problem, numerous practitioners suggest improved local market quotation systems. For instance, in U.S. Pat. No. 4,473,824, Richard N. Claytor discloses a price quotation system for distributing financial market data. Claytor's system includes a transceiver for receiving financial market data and for broadcasting selected data to users possessing handheld portable receiving and display devices. Claytor essentially discloses a "ticker-tape" transmitter with portable receiving terminals suitable for tracking trading activity related to a few user-selected securities and neither considers nor suggests techniques suitable for compiling and distributing world-wide financial market data for tens of thousands of different securities. Earlier, in U.S. Pat. No. 3,611,294, Jerry D. O'Neill et al. disclose a system of disseminating financial market data from a central broadcasting station to a plurality of portable radio receivers. Again, O'Neill et al. merely disclose a method for transmitting raw exchange "ticker data feeds" to individual users who may then accumulate data for a few user-selected securities. Also, in U.S. Pat. Nos. 4,677,434 and 5,045,848, Anthony C. Fascenda discloses a similar system for encoding and broadcasting financial market data by commercial radio transmitter to a plurality of specially-equipped portable radio receivers. Fascenda employs commercial FM broadcast spectra to transmit ticker data interleaved with a repeated stream of derivative financial market data. Fascenda considers data encoding and compression together with encryption methods to control access and improve channel efficiency but neither considers nor suggests methods for the accumulation, processing and distribution of high-quality world-wide financial market data.

Early practitioners in the art considered the limited problem of ticker data feed distribution to regional centers by land-line. For instance, in U.S. Pat. No. 3,082,402, J. R. Scantlin discloses a securities quotation apparatus that uses telephone lines to distribute exchange ticker data to regional customers who may then accumulate, process and distribute data to their clients. In U.S. Pat. Nos. 3,513,442 and 3,689,872, Frank W. Sieracki discloses a financial market data retrieval and quoteboard multiplex system that permits regional users to request and receive specific financial market data on demand from a central ticker data stream using telephone lines. In U.S. Pat. No. 4,942,616, Thomas Linstroth et al. disclose an interactive synthesized-speech quotation system for brokers that is suitable for automated response to clients who call in telephone price quote requests for individual securities. Their system offers human-speech response to such requests without human intervention.

Nothing in the present art is readily suitable for accumulating, processing and distributing financial market data of the quality and the scale required to satisfy demands arising from the recent improvements in world-wide trading technology. Such a system must be completely reliable and therefore tolerant of any possible system element failures. Data distribution must occur through the system without significant delay. Data errors must be detected and corrected, either automatically or with cued manual intervention. Finally, such a central ticker plant system must provide for adding ticker data streams from new physical and virtual exchanges and must provide for customized distribution that is responsive to user command. Nothing in the related art is suitable for resolving all of these problems.

These unresolved problems and deficiencies are clearly felt in the art and are solved by this invention in the manner described below.

SUMMARY OF THE INVENTION

The system of this invention solves the above problems by making and combining several improvements to the art. These improvements include (a) a new three-level system architecture, (b) a new redundant multi-platform hardware protocol, (c) a new broadcast feed data blocking protocol, (d) the use of multi-thread processing techniques and (e) a new Data Quality Assurance (DQA) procedure for error detection and correction. This invention combines these and other selected elements to create a new Central Ticker Plant (CTP) system for accumulating financial market data from scores of exchanges throughout the world, for processing these data to correct errors and to calculate derivative financial market data and for distributing these financial market data to a plurality of regional users, who may each submit interactive requests for customized data services.

It is an object of this invention to provide continuous CTP system operation without downtime for hardware or software repairs. It is a feature of this invention that redundant hardware architecture, including redundant database processors and redundant input data feeds, ensure continuous system operation during failures.

It is another object of this invention to provide rapid distribution of error-free financial market data without substantial accumulation, processing and distribution delays. It is an advantage of a preferred embodiment of this invention that incoming data are made available for output in less than 500 milliseconds. It is another advantage of the system of this invention that all incoming data is guaranteed delivery to the system output. Finally, it is a feature of this invention that all incoming ticker data correction messages from financial market data sources are automatically processed to correct financial market data errors. It is yet another feature of this invention that a cued manual DQA interface is provided for analyzing and correcting all "exceptions" flagged by error-detection devices within the CTP system.

It is yet another object of this invention to provide output data feeds that adapt to user commands. It is a feature of this invention that output data feeds can be configured responsive to user requests and broadcast data can be selected for repetition responsive to user request.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
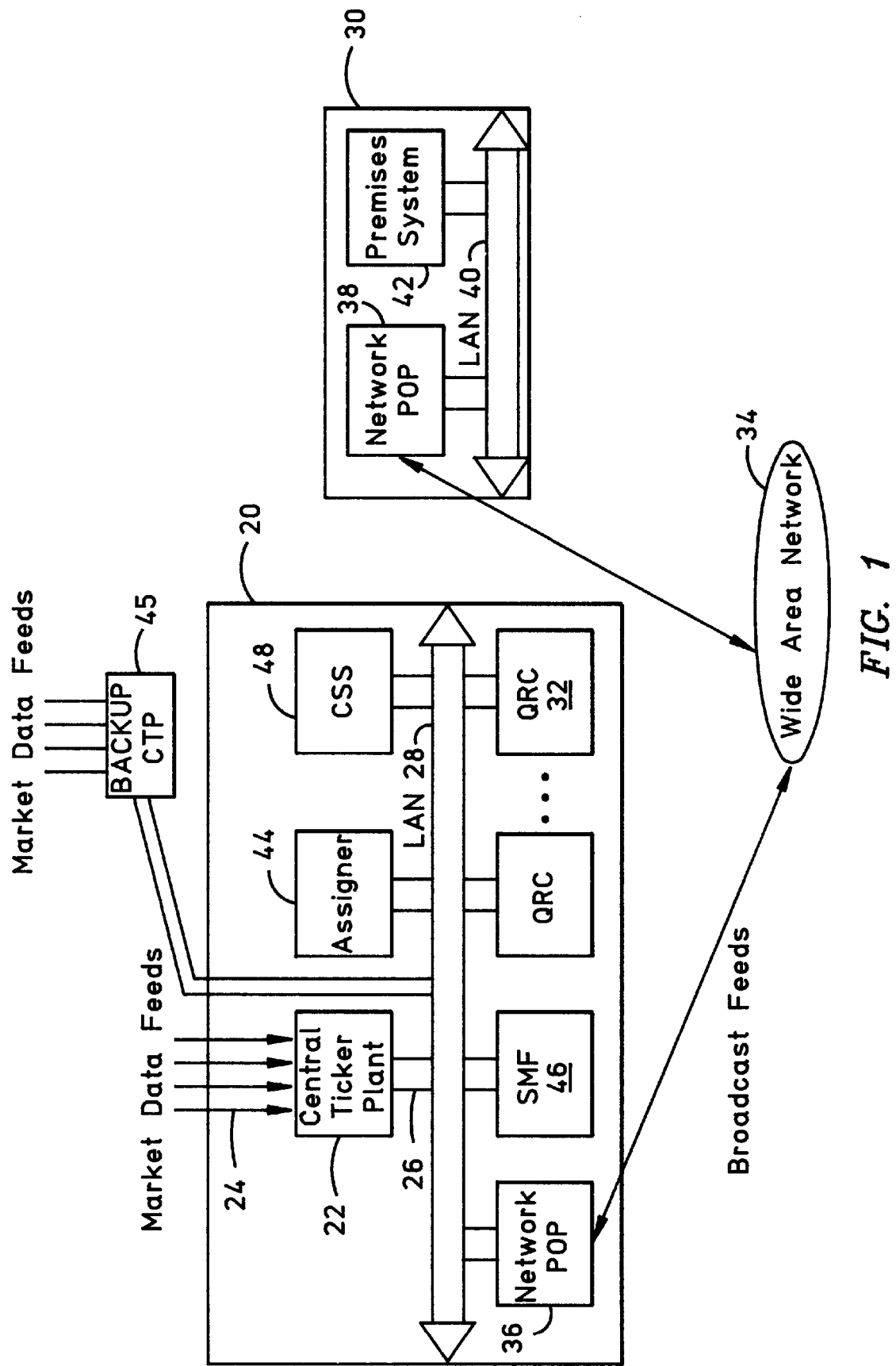
FIG. 1 is a functional block diagram showing an exemplary financial market data system embodiment including the Central Ticker Plant (CTP) system of this invention.

The system of this invention can be appreciated in the context of the embodiment of the financial market data system 20 shown in FIG. 1. The Central Ticker Plant (CTP) 22 receives financial market data on a plurality of input feeds exemplified by input feed 24. CTP 22 produces an output data stream on a broadcast feed 26, which is coupled to a Local Area Net (LAN) 28 for distribution to a variety of message destinations. For instance, broadcast feed 26 provides data messages destined to an "underlying network" of customers, exemplified by the remote site 30 and destined to a plurality of Query Response Centers (QRCs) exemplified by QRC 32. All output data messages include information specifying the message destination. Typically, a single broadcast feed output is received by all QRC systems, which are preferably physically collocated with CTP 22. As used herein, a "feed" denominates a stream of financial market data messages transferred from a single source to one or more message destinations.

Broadcast feed data and customer inquiry responses are communicated by way of a Wide Area Network (WAN) 34, which may include any suitable telecommunication system known in the art. LAN 28 communicates with WAN 34 by means of the network Point of Presence (POP) 36.

Remote site 30 includes, for example, a similar network POP 38, which couples WAN 34 to the customer local area network (LAN) 40. Broadcast feed data are transferred from CTP 22 through LAN 28 and POP 36 to WAN 34, and therefrom to POP 38 and through LAN 40 to the destination premises system 42, where the financial market data messages are processed by the customer. Customer inquiry commands retrace this path through WAN 34 to LAN 28 and therefrom to a Query Response Center, exemplified by QRC 32. QRC 32 then produces local commands and sends them to LAN 28 and therefrom to CTP 22, which responsively provides the appropriate financial data output messages to LAN 28. These customer inquiry response messages are also transmitted through POP 36 to WAN 34 and therefrom to the customer system at remote site 30.

Financial data system 20 includes an assigner 44, which accepts reports of the "state" of CTP 22 by way of LAN 28. Assigner 44 is responsible for maintaining the internal states of "primary" CTP 22 and a backup or "secondary" CTP 45 and for sending state transition commands to both. Primary CTP 22 and backup or secondary CTP 45 are identical in every respect, with backup CTP 45 giving fault-tolerant redundancy to the financial market data system of this invention. Although both CTPs need not be physically collocated, it is preferred that secondary CTP 45 be coupled to LAN 28 substantially as shown.

Financial market data system 20 is managed by a System Management Facility (SMF) 46 that responds to system-level events and alarms related to local failures, application errors, activation and deactivation, and the like.

Finally, the customer service system (CSS) 48 maintains customer records and gives authorization for responding to incoming customer inquiries. CSS 48 also provides the message destination details required in all broadcast feed data messages.

Financial market data system 20 is fully redundant in hardware and software. Two redundant CTP systems, exemplified by CTP 22 and CTP 45, are maintained concurrently so that processing continues uninterrupted in the event of any single component failure. System 20 operates continuously 24 hours per day seven days per week. All maintenance and repair functions are performed without interrupting continuous system operation. These features are further described below.

During normal operation, CTP 22 collects, validates, normalizes and enhances financial market data received from many financial exchanges throughout the world and produces output data messages having a standardized message format for delivery to customer destinations throughout the region. CTP 22 also provides special custom feeds carrying financial data to specified customers that are modifiable responsive to commands received from the message destination. As used herein, CTP 22 is said to be in "CTP online-primary" status under these circumstances. While in such status, CTP 22 is capable of receiving and spooling and processing financial market data from data sources, is capable of communication with the "underlying network" of message destinations, creates and broadcasts output feeds and is capable of providing feed recovery to the underlying network. While CTP 22 is in online-primary state, backup CTP 45 is in one of four alternate states.

These four alternate states are "CTP offline", "CTP rebuild", "CTP secondary", and "CTP online-contingency" state. While in "offline" state, backup CTP 45 is incapable of receiving and broadcasting market data and does not communicate with the financial market data sources or the underlying destination network of customers. While in the "rebuild" or the "secondary" state, backup CTP 45 is capable of receiving and spooling financial market data from the data sources and can receive processed market data from "primary" CTP 22, but backup CTP 45 cannot communicate with the underlying destination network. Finally, when in the "online-contingency" state, backup CTP 45 can receive and spool input feed data from the financial market data sources, can receive processed market data from "primary" CTP 22 and can communicate with local QRCs and other remote financial market data systems exemplified by system 20, but cannot communicate with the underlying destination network.

Upon failure within CTP 22 while in the primary state, a message is sent to assigner 44, which then arbitrates a switchover from primary CTP 22 to backup CTP 45. This switchover is accomplished by changing state within CTPs 45 and 22 responsive to commands from assigner 44. For example, CTP 22 is switched from primary state to secondary state responsive to a command from assigner 44, which disconnects CTP 22 from the underlying destination network before another command from assigner 44 switches CTP 45 from online-contingency state to primary state, which connects CTP 45 to the underlying network.

Upon catastrophic hardware or software crash in CTP 22, the CTP state is automatically switched from primary to offline. Such state change may also occur responsive to a command from assigner 44. In switching to offline status, CTP 22 disconnects from the underlying destination network, disconnects from the financial data input feeds, saves a checkpoint copy of the market database onto a disk and sends an acknowledgment to assigner 44.

Upon failure of CTP 22, backup CTP 45 must be switched from "secondary" or "online-contingency" state to "online primary", which is managed merely by connecting backup CTP 45 to the underlying destination network responsive to a command from assigner 44. This is sufficient because backup CTP 45 maintains a concurrent database copy while in the secondary state by processing data received on the input feeds and from primary CTP 22. Of course, following repair of a catastrophic hardware or software failure, the repaired CTP must be transitioned from "offline" state to either the "secondary" or the "online-contingency" state by rebuilding a concurrent database. When rebuilding, the recovering CTP is assigned to the "rebuild" state discussed above.

Either CTP is transitioned from the offline state to the rebuild state responsive to a "power-up" by first booting the system, establishing links to SMF 46 and assigner 44, checking software and database integrity, establishing communication with the primary CTP and requesting data recovery. After rebuilding, the recovering CTP is switched from the rebuild state to the secondary state responsive to completion of the rebuild procedure. This is accomplished when the two redundant databases are synchronized in concurrency. The transition to secondary state occurs by first starting input data spooling, switching to secondary state and finally reporting status to SMF 46 and assigner 44.

The transition from secondary state to online-primary state is initiated by command from assigner 44 and requires that both CTP databases be synchronized and that both CTPs have input data spooling in progress. The transition to primary state occurs by first establishing the connection to the underlying destination network, then synchronizing data with the input spool files, starting input data processing at the market data feeds, creating custom and broadcast output data feeds and finally reporting status to SMF 46 and assigner 44.

Duplication of the CTP hardware and software element provides the redundancy necessary to ensure continuous operation during maintenance and repair of either CTP 22 or 45. Moreover, each of the important CTP software elements also provide internal fault-tolerant redundancy. These fault-tolerant features are discussed in connection with the detailed description of CTP subsystems (FIGS. 3–7) after the following introductory overview in connection with FIG. 2.

In summary, FIG. 1 shows that CTP 22 accepts data from financial market input feeds, cleanses the data, enhances the data, saves the data and broadcasts the data to the underlying destination network, which includes local Query Response Centers as well as regional customers. CTP 22 and the underlying destination network communicate by way of the wellknown Transmission Control Protocol/Internetworking Protocol (TCP/IP) communications standard to perform broadcast, retransmission/recovery, feeds management, customer entitlement validation and system control. CTP 22 and the QRCs exemplified by QRC 32 are preferably collocated physically. CTP 22 provides market data broadcast and retransmission recovery functions for financial market data system 20. CTP 22 communicates with SMF 46 over LAN 28 to monitor performance, configuration and system control. CTP 22 communicates with Customer Service System (CSS) 48 to validate entitlement of users requesting feed recovery and feed manipulation services. CTP 22 communicates with the backup or contingency site system exemplified by backup CTP 45 using LAN 28 to synchronize the two CTP databases and exchange status information.

Figure 2:
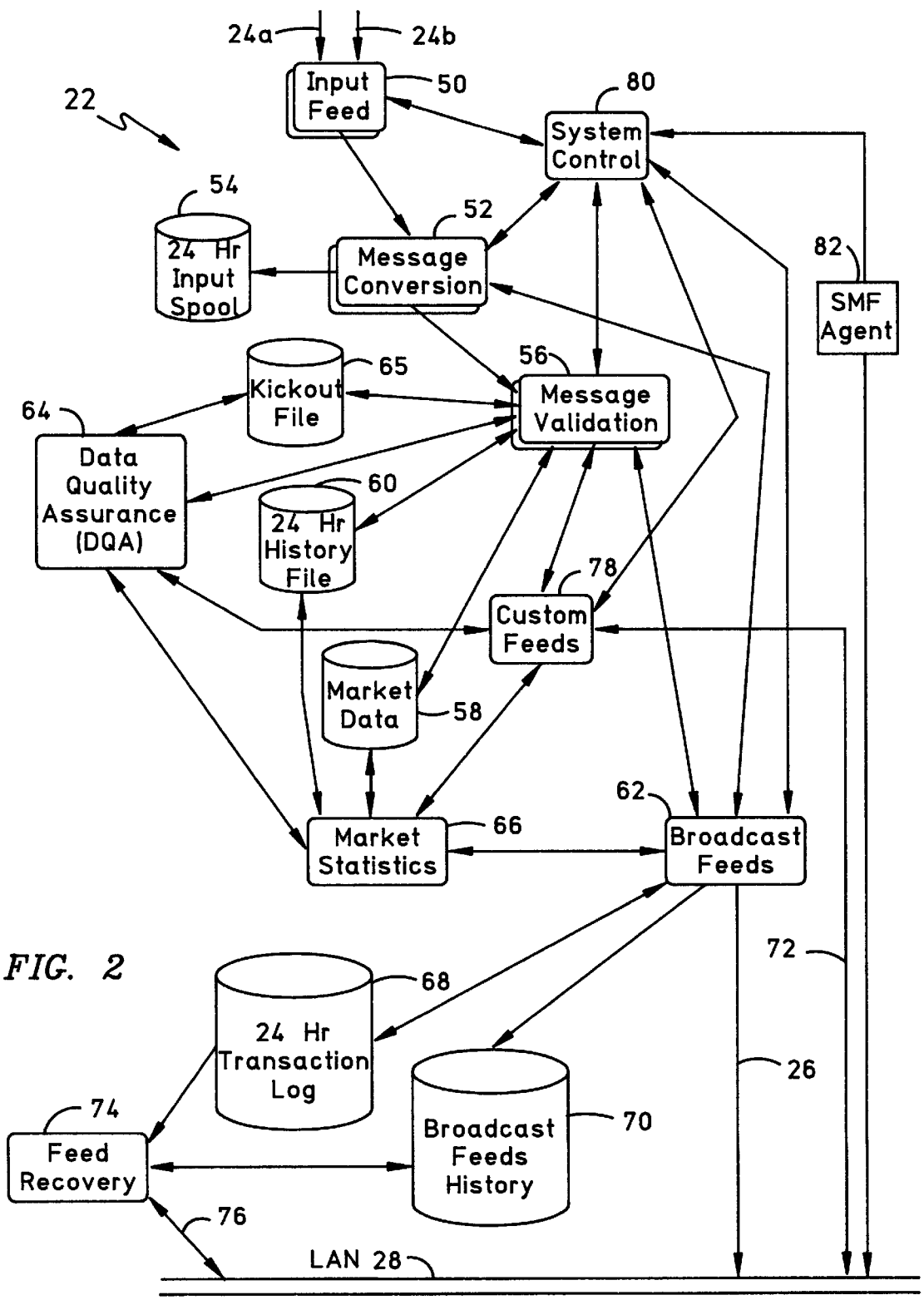
FIG. 2 is a functional block diagram illustrating a data flow architecture of the CTP system of this invention.

The internal operation of CTP 22 is shown in FIG. 2, which summarizes the dataflow architecture of CTP 22. Input feed 24 is coupled to an input feed subsystem 50, which includes multiple concurrent instances of the processing logic necessary for receiving financial market data feeds (ticker streams) from exchanges throughout the world. Each processing logic instance includes threads for receiving one or more input feeds from one exchange having a single input feed message protocol. Thus, CTP 22 accommodates the differing ticker stream protocols from the various exchanges by including an input feed processing logic instance for each known input feed message protocol. Redundant input feeds are also accommodated to improve input feed data accuracy and assist recovery from errors. For instance, FIG. 2 shows input feed 24 as a dual feed having input lines 24*a* and 24*b*, both of which provide identical ticker stream data.

Some input feeds provide consolidated ticker stream data from many different exchanges. For instance, the Securities Industry Automation Corporation (SIAC) provides two ticker streams identified as the Consolidated Tape System (CTS) and the Consolidated Quote System (CQS). The CTS feed conforms to the latest revision of the Consolidated Tape System (CTS) Vendor Communications Interface Specifications of Jun. 10, 1986. The CQS stream conforms to the latest revision of Consolidated Quotation Service (CQS) Vendor Communications Interface Specifications of Apr. 15, 1987. Both the CTS and CQS input feeds provide ticker stream data from the New York Stock Exchange, American Stock Exchange, Midwest Stock Exchange, Pacific Stock Exchange, Philadelphia Stock Exchange, Cincinnati Exchange, Boston Stock Exchange, Third Market Exchange, Instinet Exchange, Consolidated File Exchange and the Chicago Board of Options Exchange Equities Stream.

As another example, the Options Price Reporting Authority (OPRA) input feed conforms to the latest version of the Specification for Interface between OPRA Processor and Vendor dated Apr. 20, 1989 and includes ticker stream data from the American Options Exchange, the New York Options Exchange, the Chicago Board of Options Exchange, the Pacific Options Exchange and the Philadelphia Options Exchange. Up to four independent but redundant input feeds are accepted from each such financial data source to ensure fault-tolerance and continued operation during random telecommunication failures. Other domestic input feeds include ticker streams such as the National Association of Securities Dealers (NASD) Systems Stream, the Automated Bonds System High Speed Quotes (BQS) Stream, the Interexchange Technical Committee (ITC) Format Commodity Feeds (which include nine important commodity exchanges) and the Commodity Options Center Exchange Stream. Foreign input feeds include the European Options Input Feed, the London Metals Exchange (LMEX) Stream, the Tokyo Stock Exchange Stream,, the Osaka Stock Exchange Stream and streams from Hong Kong, Singapore, Amsterdam, Brussels, Paris, Frankfurt, Luxemburg, Milan, the Australian Stock Exchange and many other sites.

Each of these ticker stream input feeds consists of a stream of input messages each conforming to a specific predetermined input message protocol. As used herein, an input message consists of a packet of financial market data organized according to an input message protocol. For example, a single input message may include a ticker symbol identifying a particular security, a bid price, an ask price, a trade price, a trade volume, a timestamp and other header and error correction data. Input feed subsystem 50 accumulates each such input message and passes the complete input message to the message conversion subsystem 52.

Message conversion subsystem 52 includes multiple concurrent instances of the processing logic needed to convert an input message to an internal message having a normalized internal message protocol. Each instance of message conversion subsystem 52 verifies input message sequence number (where provided) and data consistency within the input message envelope. Each input message received during the past 24 hours is permanently stored in a 24-hour input spool 54, which is dumped to an archive and reset every 24 hours. Message conversion subsystem 52 converts the input message data to the CTP internal format and sends the resultant internal message to the message validation system 56. When an input message is found to be inconsistent with the corresponding protocol or when a message sequence number is missing, message conversion subsystem 52 automatically requests retransmission from the corresponding financial market data source where supported. Message conversion subsystem 52 also identifies and arbitrates removal of duplicate input messages from the incoming data stream. When one of two duplicate input messages is incomplete or otherwise in error, the valid copy is identified and retained for use by the CTP system.

Message validation subsystem 56 provides multiple concurrent instances of the message validation logic each receiving a stream of internal messages each conforming to a normalized internal message protocol or format. Subsystem 56 provides for the processing of different classes of security instruments and for the storage of the market data changes (updates) into separate market data files. As used herein, financial market data includes trading information for a plurality of securities that are classified according to predetermined security classes or types. For instance, such security classes include stocks (equities), bonds, options, commodity contracts, and many others. Within each security class, many different securities are traded on many different exchanges. Message validation subsystem 56 is organized according to major security class, as are the market data file 58 and the market data history file 60.

Message validation system 56 tests the incoming internal message data for consistency with the related financial market data values stored in market data file 58. When these consistency tests are satisfied, the appropriate derivative data are calculated from the incoming message data and the market data file 58 and history file 60 are changed (updated). A corresponding transaction message is then created and sent to the broadcast feeds subsystem 62. Market data history file 60 stores a full 24-hour series of such transaction messages for each financial market data source. When a consistency test fails, an exception message is produced in subsystem 56 and sent to the Data Quality Assurance (DQA) subsystem 64 and to the kickout file 65, which stores all such exception messages for manual processing. Message validation subsystem 56 also provides logic necessary for the automated processing of correction messages received from the source exchanges.

The market statistics computing subsystem 66 provides internally generated financial market statistics and indices that are updated periodically responsive to the incoming financial data stream. These statistics are calculated from the contents of market data file 58 and market data history file 60 and are forwarded to broadcast feeds subsystem 62 after storage in market data file 58.

Broadcast feeds subsystem 62 saves the transaction messages received from message validation subsystem 56 in a transaction log file 68, organizes the transaction messages into data blocks and assigns block sequence numbers in each feed, performs data compression and transmits the resulting broadcast feeds data to LAN 28 on line 26. Transaction log file 68 retains up to 48 hours of broadcast feeds data. The oldest 24 hours of these data are dumped to an archive daily, thereby maintaining a minimum of 24 hours of broadcast feed data with which to respond to retransmission requests received from users in the underlying network. Each broadcast data block is transmitted once for each feed. CTP 22 provides on line 26 a full (broadcast) feed of all data blocks for each destination in the underlying network. A number of independent customized data feeds each including a stream of blocked transaction messages for customer-selected securities are also interleavedly transmitted on line 26 responsive to requests received on the custom feed line 72. Broadcast feeds subsystem 62 spools the last 24 hours of output data blocks in the broadcast feeds history file 70.

Feed recovery subsystem 74 processes requests for retransmissions received from the underlying network and arranges for resending the requested data blocks, first locating them in broadcast feeds history file 70 and then transferring them to LAN 28 on line 76.

DQA subsystem 64 provides an interface for manual processing of corrections, errors, exceptions and administrative messages that cannot be automatically processed. DQA subsystem 64 also provides an interface for manual maintenance of market data file 58. Although data records for new securities can be added to market data file 58 as updates for new ticker symbols are received, this process is manually monitored through DQA subsystem 64, which also provides for the manual addition, deletion and adjustment to data content needed to accommodate financial market circumstances such as stock splits and dividend payments that are unreported in the input ticker streams.

Custom feeds management subsystem 78 receives requests from the underlying network by way of interface 72 to LAN 28 for the addition or deletion of security ticker symbols to one of several feed lists in a custom feed definition file. All such requests are first referred to CSS 48 (FIG. 1) for verification before modifying custom feed content. Custom feeds subsystem 78 permits dynamic reconfiguration of a plurality of custom feeds tailored to individual customer requirements.

The system control subsystem 80 provides configuration management, system initialization, system state management, and collects and reports statistics and alarms. System control subsystem 80 communicates to System Management Facility (SMF) 46 (FIG. 1) by way of the SMF Agent subsystem 82, which provides the primary interface between internal CTP applications and SMF 46.

Figure 3:
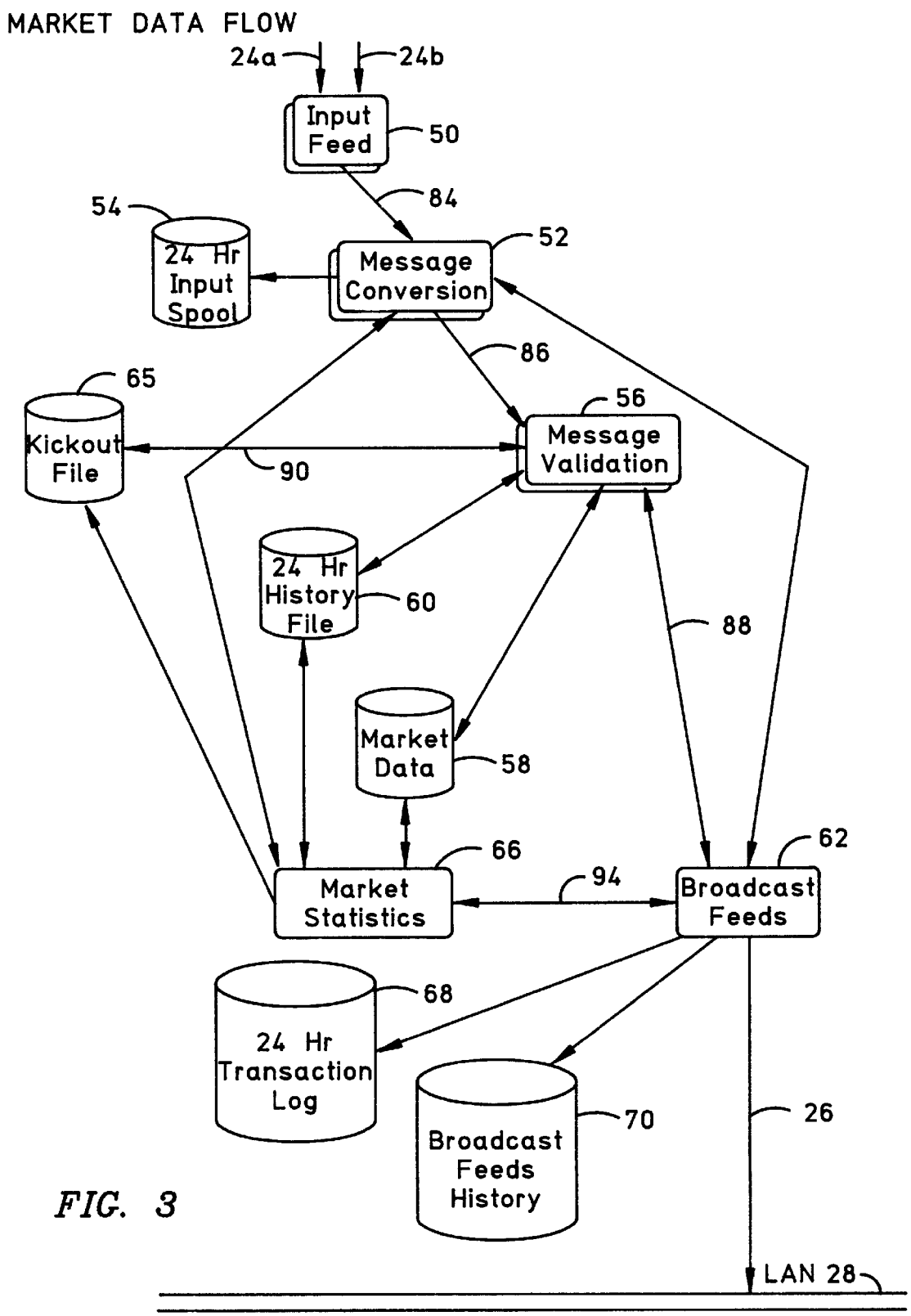
FIG. 3 is a functional block diagram illustrating the market data flow for the CTP system of this invention.

The CTP subsystems discussed above in connection with FIGS. 1 and 2 are now described in more detail. FIG. 3 shows the financial market data flow diagram for CTP 22 (FIG. 1). Input feed subsystem 50 accepts input feed data from the financial data sources as discussed above in connection with FIG. 2. Some input feeds, exemplified by input feed 24, are provided twice (e.g., 24a and 24b) over diverse paths from the source exchange to improve fault tolerance at the input feed. Processing of duplicate input lines produces redundant input messages because both identical input messages are processed except when one input message is discarded for error. Duplicate input messages are removed in message conversion subsystem 52.

Each concurrent input processing logic instance in input feed subsystem 50 performs several functions. These include validating the input feed protocol envelope, ascertaining and reporting line status and statistics and controlling incoming line communications. Most input feed messages are enclosed in a specific line protocol envelope. Each message is checked for protocol validity. Messages that do not satisfy the validity checking logic are flagged as errors and forwarded to message conversion subsystem 52 for logging and additional error processing.

Some input feed lines provide a line status or heartbeat message when no input data are being sent by the corresponding source exchange. These heartbeat messages serve to assure input feed subsystem 50 that the line is active and functional. When heartbeat messages are received, they are forwarded to message conversion subsystem 52 for logging. Input lines that do not provide line status or heartbeat messages are monitored with a configurable timer to provide an error message when the timer "times-out" between messages. These "time-out" error messages are also forwarded to message conversion subsystem 52 for logging.

Several statistics and line status indicators are maintained for each input line. These include the current line and communications board status, the number of correct messages received since start-of-day or session (correct messages are those messages that satisfy the link level Cyclic Redundancy Checksum (CRC) error detection logic), the current and maximum correct-message rates (messages per second), the number of protocol errors found since start-of-day or session, and the current and maximum protocol error rates (errors per unit time). These line statistics are maintained for reference by SMF agent 82 (FIG. 2). A separate alarm indicator is set if an error rate reaches a predetermined threshold value. Input feed subsystem 50 also responds to commands issued by the System Management Facility 46 (FIG. 1) forwarded by way of SMF agent subsystem 82. These commands relate to the physical input/output parameters and line operation, including the "enable input line" and "disable input line" commands, which are merely representative of the types of hardware commands used.

Input feed subsystem 50 communicates with message conversion subsystem 52 over the interface 84. Complete input messages are passed from subsystem 50 to subsystem 52. Message conversion subsystem 52 spools the input messages, performs header and data field validation activities and normalizes each input message to a common CTP internal format or protocol. A single concurrent conversion logic instance within message conversion subsystem 52 communicates with one or more concurrent logical instances within input feed subsystem 50, provided that all received input messages conform to the same input protocol requiring a similar header, data field validation and normalization actions. Messages sent by way of the communications interface 84 are received by message conversion subsystem 52 in sequential order. Interface 84 does not support priority queuing or any other method of message manipulation.

A single concurrent logical instance of input feed subsystem 50 communicates with only one concurrent logical instance of message conversion subsystem 52. The relationship between subsystems 50 and 52 is governed by a predetermined input line configuration file. Message conversion subsystem 52 generates a retransmission request to input feed subsystem 50 over interface 84 when an out-of-sequence condition in the feed is detected, provided that automatic retransmission is supported by the corresponding market data feed source.

Message conversion subsystem 52 receives incoming input messages from input feed subsystem 50 and timestamps them. This timestamp permits internal throughput monitoring. Subsystem 52 then spools the complete input messages and performs input arbitration, header and field validation, message normalization and message accounting procedures. This process also spools input feed data received outside the normal trading hours but normally does not otherwise process the data because doing so could contaminate the database with test data provided by the exchanges.

Subsystem 52 spools all input message data to input spool 54 in a format as close as practical to the original input feed message protocol. Input spool 54 provides a record for use in auditing errors later found in market data file 58 and can be dumped and replayed for system diagnosis and testing purposes.

Because duplicate input feeds are processed by input feed subsystem 50 for most market data sources, message conversion subsystem 52 receives duplicate copies of input messages from most sources. Duplicate input messages are identified and removed from the data stream in a process herein denominated as input message arbitration. Where duplicate input message feeds are processed, the input arbitration logic passes the first occurrence of each message regardless of its source. Neither duplicate input port is designated as a primary or secondary data source. After the first message has been processed, any later duplicate message is detected and removed from the data stream by arbitration logic (not shown) within the instance of message conversion subsystem 52. Complete input line statistics and error reporting is maintained for each redundant input feed. Where the redundant input feeds provided by the financial data source do not provide precisely identical messages, provision is made for manual assignment of the redundant input feeds as the "master" source, thereby forcing message conversion subsystem 52 to ignore all data from the secondary input feed.

Input message header validation processing logic within each instance of message conversion subsystem 52 determines the message type, financial instrument class and the necessary processing. Data field validation logic within each instance compares the data format within each data field for consistency with the corresponding input message protocol field definition. The specific details of these functions are potentially different for each of the market data feeds arriving at CTP 22. An input message parser is provided for each financial data feed protocol and new protocols can be accommodated by adding the necessary corresponding parsing logic. Messages that fail the header validation test are forwarded, along with messages tagged as having failed the input feed envelope validation test received from input feed subsystem 50, to message validation subsystem 56 by way of the interface 86. Input messages that pass header validation logic testing and which have no earlier-appended fault flags are first normalized to a standard internal protocol and then forwarded to message validation subsystem 56.

Message normalization logic within each logical instance of subsystem 52 converts each valid input message to the CTP internal record format. The resulting output on interface 86 is a normalized internal message conforming to the internal protocol for each valid input message. Message conversion subsystem 52 maintains statistics in each instance reporting the number of processed input messages, characters and errors by type, maintains a message sequence number independently for each market data feed and generates an alarm if a message sequence number is missed or if errors are detected at a rate above a predetermined threshold value. Also, subsystem 52 generates automatic retransmission requests to the market data source when message sequence numbers are missed, provided that the source accepts such requests. All normalized internal messages are tagged with a passed/failed validation indication to the appropriate logical instance within message validation subsystem 56 using an Instrument-to-Validation Routing Table.

Message validation subsystem 56 first refers to market data file 58 to ensure the presence of the financial security class and instrument referenced in an internal message and performs range checking on the appropriate data fields. Each logical instance of subsystem 56 also calculates derivative data, generates market data file 58 entries and 24-hour history file update entries and finally creates a corresponding transaction message for transfer to broadcast feeds subsystem 62 over interface 88. A single logical instance within message conversion subsystem 52 can communicate with one or more logical instances within message validation subsystem 56. A single logical instance within subsystem 56 can communicate with one or more logical instances within message conversion subsystem 52. The particular financial market data source and the relevant financial instrument class together determine the relationship between concurrent instances of subsystems 52 and 56, as represented in the Instrument-to-Validation Routing Table. Internal messages sent over interface 86 are received by message validation subsystem 56 in sequential order and interface 86 does not support priority queuing or any other method of message manipulation.

Each instance of message validation subsystem 56 performs several fundamental functions, including validating the existence of the security class and instrument, range check validation, sales condition processing, derivative data calculation, market and history file update and maintenance, automated corrections processing, periodic refresh cycle generation and feed list modification. Subsystem 56 spools all internal messages that fail validation to kickout file 65. Validated internal messages are converted to transaction messages and forwarded to broadcast feeds subsystem 62 together with an attached list of message destinations within the underlying network. Internal messages that fail the validation testing are forwarded as transaction messages to broadcast feed subsystem 62 with attached fault-indication data and a list of message destinations.

Each logical instance of message validation subsystem 56 reads market data file 58 searching for the existence of the security named in an incoming internal message particular security is not found, subsystem 56 adds the security to data file 58 using a predefined parameter set for new data records. Additionally, the subsystem 56 instance generates a message to kickout file 65 indicating that the particular security was not found and providing information necessary to locate the newly created record keyed to the "ticker symbol" for that security. This procedure permits manual override of the automated procedure by a data quality administrator should the "new" security symbol arise because of error at the source of the incoming message. Because some financial data sources transmit messages conveying symbol additions, deletions and changes, message validation subsystem 56 automatically updates market data file 58 to reflect these changes. These automatic ticker symbol additions, deletions and changes also generate messages to kickout file 65 to permit the manual entry of any additional information required.

Range checking logic within each instance of subsystem 56 automatically compares certain data fields with predetermined thresholds to detect errors. For example, range checking applicable to security classes such as equities includes reviewing data fields corresponding to "bid price", "ask price", and "trade price". Such range checking is done for each trade or quotation update message. That is, each of these fields is checked against previous values transmitted and, if the change in value is found to be beyond a predetermined magnitude, the entire message is flagged as an exception and diverted to kickout file 65 for manual processing. Of course, range checking parameters for the first trade of a session must differ from those of subsequent trades. Such range checking parameters are provided for each financial data source within each input feed. When there is more than one class of instrument traded at an exchange (having the same exchange identifier), the necessary plurality of range check parameters are provided for each class of instrument traded at the exchange.

Range checking logic operates in an OVERRIDE mode, an OFF mode or an ON mode. OVERRIDE range checking logs all range check failures but permits application of the message data to market data file 58. OFF range checking applies all message data to market data file 58 and performs no range checking. ON range checking performs range checking on all data and permits only qualified message data to be applied to market data file 58. All failing messages are assembled into message blocks and transferred to kickout file 65.

The range check values are freely modifiable for application to the next processing update message received. For instance, the first trade of a session is checked against the previous close and must be less than a defined increment or delta. Subsequent trades use thresholds exemplified by a fixed percentage of price within fixed ranges. If the price is out of range, a bid/ask range check is then performed and an exception message is generated and transmitted to kickout file 65 as well as forwarded with the appropriate rejection error code to broadcast feed subsystem 62. Additionally, internal messages received by message validation subsystem 56 from message conversion subsystem 52 that are flagged as having failed the feed envelope validation test or the header and data field validation tests are logged to kickout file 65 and forwarded to broadcast feed subsystem 62 with the appropriate rejection error code.

Specific sale conditions require a special processing logic within each instance of message validation subsystem 56. For instance, equities processing requires a special provision for delayed opens, cancelling of last transaction, and sales where the price is not for the current last period. Processing of an unrecognized sale condition causes generation of an exception message that is logged to kickout file 65 for manual processing by the DQA operator. Because CTP 22 passes all sales conditions from the financial market data sources through to the underlying network of user destinations, two sale condition data fields are provided to broadcast feeds subsystem 62. The first of these is the original sale condition information received from the exchange and the second uses a mapped sale condition created by the special sales condition processing logic.

Message validation subsystem 56 also performs the derivative data calculations stored in market data file 58.

Additional to the current derivative data such as "day high", "day low" and "net change from previous close", CTP 22 maintains an update sequence number for each ticker symbol in addition to independent trading session derivative data, true 52-week highs and lows, contract life high/low, and a tally of new highs/lows for the day. A separate consolidated record is updated to provide these derivative data for issues that trade in a consolidated market over many different exchanges, such as many of the equities listed in the primary U.S. markets.

Subsystem 56 updates market data file 58 and history file 60 and adds broadcast feed information, which includes a bit map of the message destinations for the particular security data within each transaction message. The broadcast feed information is stored with each ticker symbol in market data file 58. The transaction message enhanced by a broadcast feed bitmap is then retrieved from market data file 58 by subsystem 56 and transmitted to broadcast feeds subsystem 62 over interface 88. The appropriate statistics are then updated in market data file 58, which maintains a current record for each ticker security symbol. History file 60 maintains a history of updates applied to the current security record throughout the trading day for every security ticker symbol, which information is maintained primarily for error correction processing.

Automated error corrections processing logic within each instance of message validation subsystem 56 processes exchange-generated correction messages automatically whenever possible. These exchange messages provide data to correct previously-reported trades and affect both market data file 58 and history file 60. The following is an example of the logic associated with processing exchange-generated correction messages as received from message conversion subsystem 52:

(1) Based on the exchange-generated correction message type (error, cancel or correction), automatically perform:
  (a) error processing: adjustments to be made to volume (plus/minus) and optionally to price, e.g., changes to last price, high/low/open;
  (b) cancellation processing: adjustments to be made to volume (plus/minus) and/or price; or
  (c) correction processing: compare original trade data to correction data and, accordingly adjust volume, price or both. For symbol correction processing, adjust volume and price per symbol.

(2) Retrieve market data file record and update it with adjustments.

(3) Format and send an adjustment message to broadcast feeds subsystem 62.

(4) If, for any reason, the correction message cannot be processed automatically, place the message in a kickout log file for manual processing by the DQA operator.

A periodic refresh cycle generation logic within each instance of message validation subsystem 56 automatically generates refresh messages that are transmitted on the broadcast feed at a priority lower than the primary data update messages. The refresh cycle provides a second level of assurance that all message destinations have the same data as the CTP. The refresh cycle is the only source for correcting customer systems that elect not to use the retransmission recovery service discussed below. Messages in the refresh cycle contain all "dynamic" data fields maintained for each security type. Logic provides for "intelligent" refresh that permits tracking of specific issues that experience recent activity in the market. The intelligent refresh option is normally active during the active issuend, when active, only the active issues are transmitted during the refresh cycle. The refresh cycle processing logic also transmits updates needed to prepare the remote system (CTP 45 in FIG. 1) files for the next market open of exchanges where trading is not continuous around the clock. Messages in the market-open cycle contain both dynamic (updated by market activity) and static (not updated by market activity) data fields. The transmitted static data fields include any defined system-wide "alias" symbols for the security issue.

Message validation subsystem 56 receives requests from custom feeds management subsystem 78 (FIG. 2) for the addition or deletion of ticker symbols from specified custom feed lists. These requests are validated before transmission from custom feeds management subsystem 78 for both entitlement to modify the feed and entitlement for the data. Subsystem 78 also verifies that the requested data will not cause the custom feed to exceed its allocated bandwidth. Message validation subsystem 56 updates the Market Data File 58 record for each security affected by the custom feed request and adds/deletes the feed from the list of feeds to which the symbol is a member. Whenever a symbol is added to a feed, message validation subsystem 56 generates a summary message for that symbol and marks it for transmission on the feed to which it has been added.

Messages are passed from validation subsystem 56 to DQA subsystem 64 (FIG. 2) in CTP internal protocol by way of kickout file 65 over the interface 90. Interface 90 handles several types of messages, including exchange-generated correction messages, exchange-generated administrative messages, exception messages and invalid messages that failed header/field validation tests within subsystems 52 and/or 56. Each of these messages has the logical contents necessary to support the subsequent processing logic. For example, an exchange-generated correction message can include a correction header, correction source, message type (cancellation, error or correction), timestamp, original security data (exchange ID, symbol ID, symbol sequence number, volume size, last price), and corrected security data (exchange ID, symbol ID, volume size, last price). The resulting transaction message created by an instance of subsystem 56 and transmitted over interface 90 is herein denominated an adjustment message. Adjustment messages are created following the update of market data file 58 and history file 60 and are sent by subsystem 56 over interface 88 to broadcast feeds subsystem 62 for distribution to the underlying network destinations. An exemplary adjustment message includes the adjustment type (volume adjustment or volume and low price or volume and high price or price adjustment), security data (exchange ID, symbol ID, symbol sequence number), and trade data (volume size, last price). Adjustment messages that cannot be processed by message validation subsystem 56 are forwarded to kickout file 65 for manual processing in DQA subsystem 64 (FIG. 2).

Administrative messages are received from input feed subsystem 50 and processed by message conversion subsystem 52. An exemplary administrative message includes administrative header, administrative source, network ID, CTP ID, message type, timestamp, exchange ID, and administrative text. Responses to such administrative messages create updates to market data file 58 and, in some cases, history file 60. Such updates may include an adjustment or transmission of a response to broadcast feeds subsystem 62. An exemplary response to an administrative message includes message type, security data, exchange ID, symbol ID, symbol sequence number, optional flags, administrative data, creation date, termination date, and action (new security/issue, termination of security/issue, earnings data modifications, trade history update, X-dividend, stock split, etc.) Administrative messages that cannot be processed by message validation subsystem 56 are forwarded to kickout file 65 for manual processing in DQA subsystem 64.

Exception messages are those messages that are rejected by message validation subsystem 56. Exception messages require manual intervention by a data quality administrator who must analyze the exception message and enter the corrected data. An exemplary exception message includes exception header, exception source (network ID, CTP ID), message type (no find, price kickout, volume kickout or text message), timestamp, exception code, security data (exchange ID, symbol ID, symbol sequence number) and trade data (volume size, last price). Each exception message demands a manual response, which may result in message rejection or correction by updates transmitted to market data file 58. A manual adjustment or other response to each exception message is transmitted by message validation subsystem 56 to broadcast feeds subsystem 62 and therefrom to the underlying destination network.

Any message that is rejected by either input feed subsystem 50 or message conversion subsystem 52 is herein denominated an "invalid message", which is forwarded to message validation subsystem 56 for action. Invalid messages require manual intervention by a data quality administrator who must analyze the message and enter the corrected data. An exemplary invalid message includes message header, reason for invalidity, network ID, CTP ID, message type (redundancy check, invalid field, invalid message type or invalid format), timestamp, invalidity code, security data and trade data. Each invalid message requires manual message rejection or manual updates to market data file 58 and history file 60. Any adjustment or response message is formatted and transmitted from message validation subsystem 56 to broadcast feeds subsystem 62 for distribution to the underlying destination network.

Message validation subsystem 56 communicates with DQA subsystem 64 (FIG. 2) by way of the direct interface 92 (FIG. 5) and the indirect kickout file interface 90. Data messages are passed from subsystem 56 to subsystem 64 as internal messages conforming to internal protocol and include record request/response, record update/confirmation, record add/delete, and the like. Market statistics computing subsystem 66 accepts trade, quote and correction messages from broadcast feeds subsystem 62 and performs application-dependent calculations for every transaction message or block of transaction messages received within a predetermined time interval. Market statistics subsystem 66 updates the statistics data in market data file 58 and history file 60 and forwards the resulting statistics as transaction messages to broadcast feeds subsystem 62 on an interface 94. The frequency of statistical updates is application-dependent and configurable.

Market statistic subsystem 66 also receives, processes and responds to requests for the addition, deletion, listing and correction of statistics forwarded from DQA subsystem 64. A plurality of logical applications within market statistics subsystem 66 includes statistics logic for creating market-related statistics such as volumes, averages, trends and the like, options volatility indices (OVIs) as used by Dynamic Options Class Display (DOCD) systems, and the creation, maintenance and distribution of security instrument lists of related symbols such as option class lists for all option series traded.

Broadcast feeds subsystem 62 provides data spooling, feed creation and broadcast functions. It also uses the internal timestamp in each transaction message received to calculate transit time for internal throughput monitoring. Subsystem 62, in primary CTP mode, also transmits feed information to the contingency CTP backup system 45 discussed above in connection with FIG. 1 to keep the contingency database files current. In contingency or secondary CTP mode, broadcast feeds subsystem 62 receives feed information from the primary CTP site and stores the data in the transaction log file 68 and broadcast feeds history file 70. Broadcast feeds subsystem 62 receives data from message validation subsystem 56 and market statistics subsystem 66. These data contain both transaction information such as trade quote, correction, text and the like, and feed identification information that specifies the output message destination. Both the transaction and feed information is spooled to transaction log file 68. A pointer to the spool file record in transaction log 68 is stored in broadcast feeds history file 70 as described below.

A Feed Definition and Network Configuration Table is used by subsystem 62 to map the feed identification information within the received transaction message to the underlying network address or addresses or to a local process such as market statistics subsystem 66. The transaction message information is extracted and duplicated for every specified feed destination. These transaction message data for each feed are formatted for transmission and stored into a transmission block maintained individually for each output feed message destination. Broadcast feeds subsystem 62 maintains the block sequence number and a transmitted broadcast feeds history file for each such feed generated.

Broadcast feeds history file 70 contains a series of records each containing the block number, symbol ID and a pointer to the transaction log file 68 location for each transaction message in the block. Broadcast feeds history file 70 data are used to reconstruct a block for retransmission to any of the feed message destinations. The history file 70 record is completed and saved when a transmission block is filled and sent or when no more data are available for transmission and the block is closed and sent partially full. Partially-filled transmission blocks are sent when sufficient transaction data are not available to keep the transmission current (e.g., within 500 ms of transaction timestamp).

Figure 4:
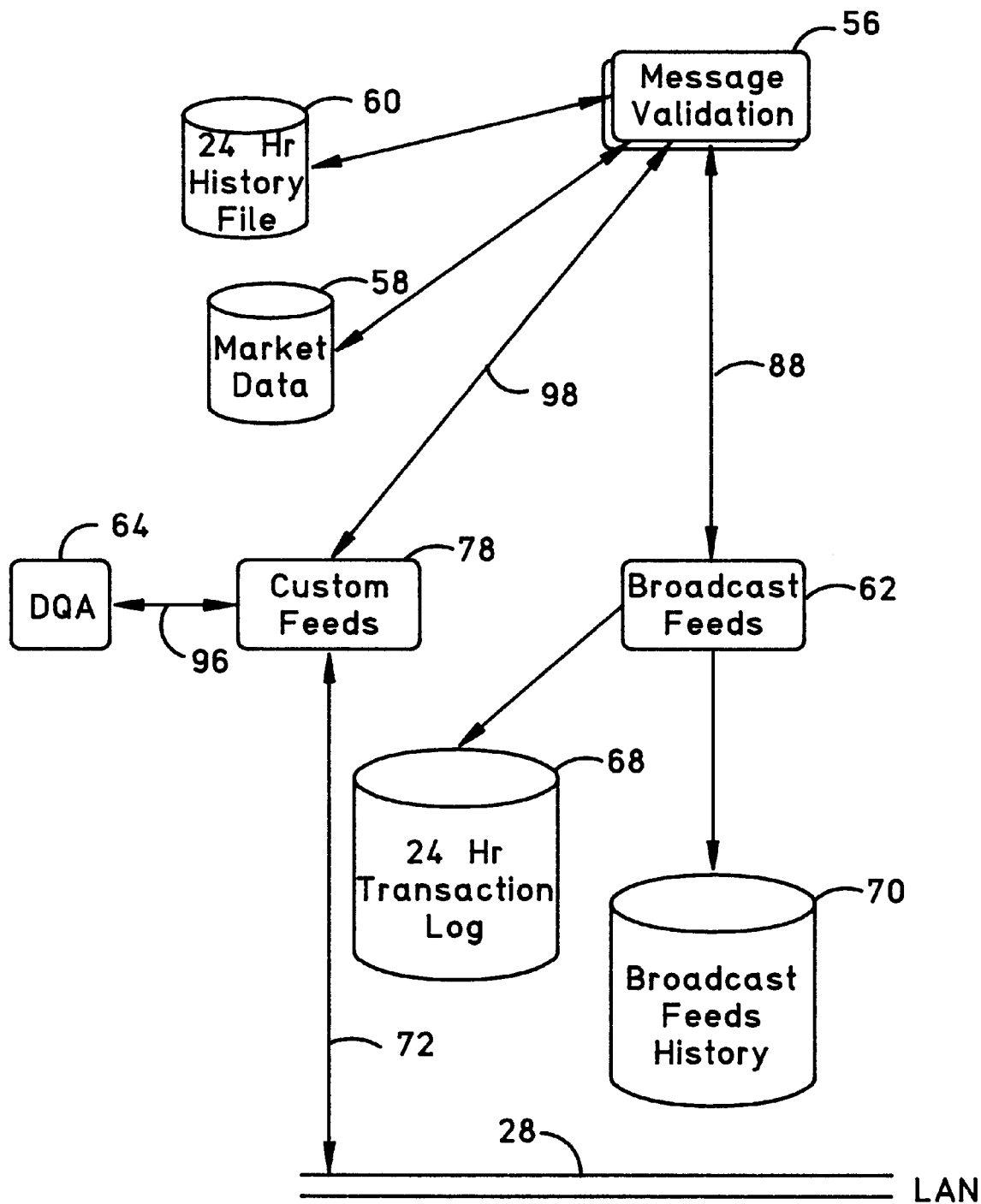
FIG. 4 is a functional block diagram illustrating the custom output feed management data flow for the CTP system of this invention.

FIG. 4 shows the feed management data flow diagram for CTP 22 (FIG. 1). Custom feeds management subsystem 78 accepts feeds manipulation requests from DQA subsystem 64 on an interface 96. Subsystem 78 also accepts feed manipulation requests from users in the underlying destination network on interface 72. Subsystem 78 validates user entitlement by requesting it from CSS system 48 (FIG. 1). If the user is entitled to manipulate the feed definition and the feed is not at its bandwidth capacity limit, subsystem 78 forwards the request as an internal message to the appropriate instance of message validation subsystem 56 on an interface 98. Message validation subsystem 56 adds or removes the feed indicator for the symbols in the request, generates a refresh-summary transaction message for adding the symbol to the feed request and forwards the message to broadcast feeds subsystem 62 for distribution to the requested feed only. Message validation subsystem 56 responds to custom feeds management subsystem 78, which responds to the requester specifying a completion code.

The custom feeds are limited in number to the system hardware capacity provided for CTP 22. A custom feed change request includes the feed identifier, the action to be taken (add, delete or display) and the ticker symbol or list of symbols (including wild-card designations). Because each record (symbol) in market data file 58 includes a list of feeds (message destinations) to which it is a member, custom feeds management subsystem 78 manipulates market data file 58 records by way of message validation of system 56. If a change cannot be permitted, a message is sent to the requesting system denying the request and a rejection is produced and transmitted to kickout file 65 for monitoring and follow-up by the DQA operator. The requested change takes effect before the next update is received by message validation subsystem 56 for the relevant symbol. The feed list change also causes subsystem 56 to generate a summary message for broadcast by subsystem 62 to the underlying network. A response to the request is also sent to the requesting customer system by the same route.

Custom feeds management subsystem 78 processes requests as described above without logic for mediating conflicting requests. Where more than one terminal is entitled to send custom feed update requests for a single custom feed, no attempt is made to keep the symbol in the feed until all terminals have requested that it be removed, for instance.

Figure 5:
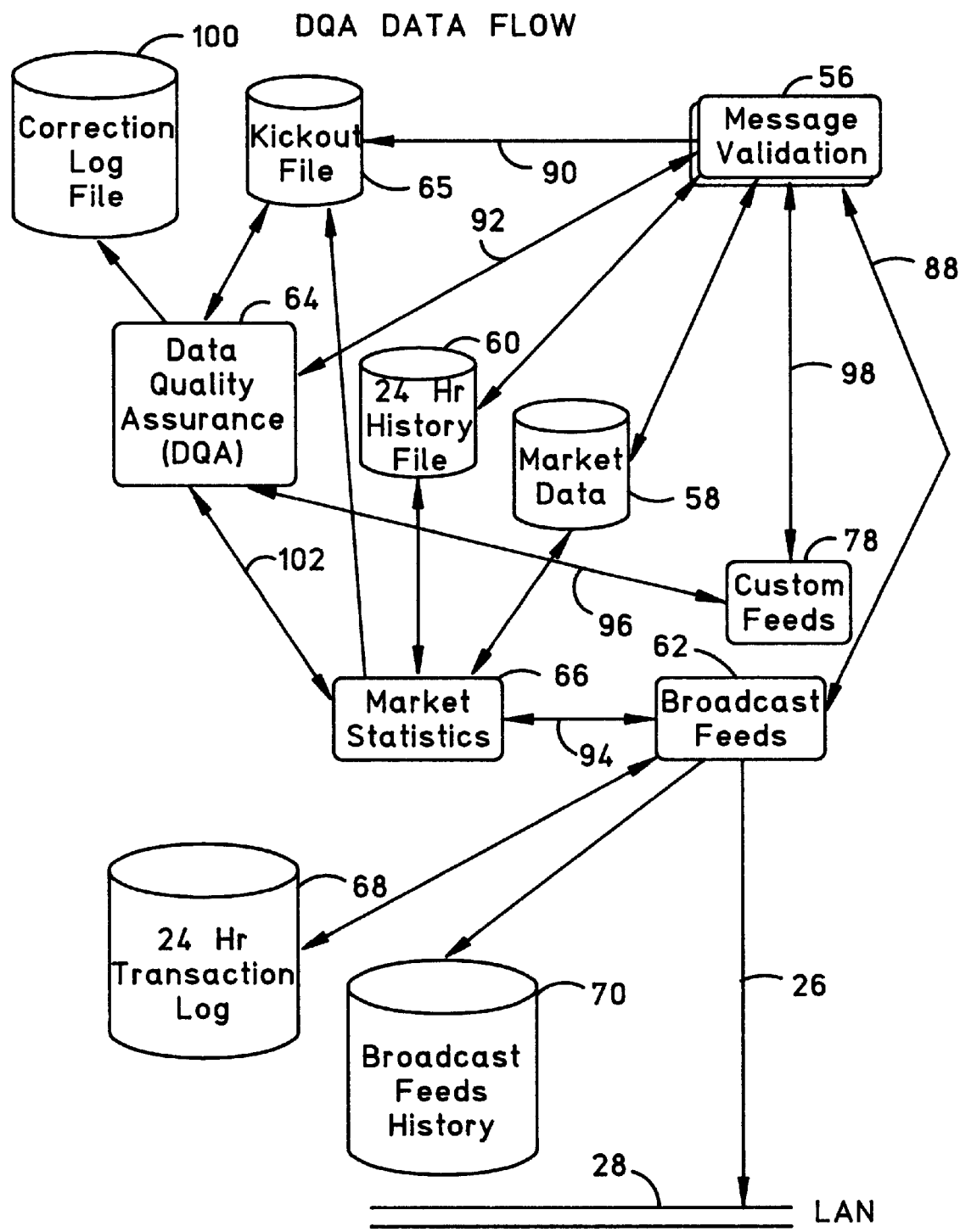
FIG. 5 is a functional block diagram illustrating the Data Quality Assurance (DQA) data flow for the CTP system of this invention.

FIG. 5 provides a schematic view of the DQA data flow of the CTP 22 from FIG. 1. DQA subsystem 64 receives copies of the messages from kickout file 65 that have failed testing by message conversion subsystem 52 or message validation subsystem 56. DQA subsystem 64 may request the entire current record for the symbol requiring correction by way of message validation subsystem 56 and then may perform correction and forward the corrected record to subsystem 56 for storage in market data file 58 and history file 60. All manual operator activity is logged to a corrections log file 100. Subsystem 64 also requests that market statistics subsystem 66 add/delete or modify statistics or may request that custom feeds management subsystem 78 add or delete symbols and so forth. This corrections function includes making online adjustments to the market data responsive to data received in correction messages from the exchanges (when these cannot be automatically processed), exception messages from message validation subsystem 56, administrative messages from the exchanges and data from a number of other sources such as reports and newspapers.

DQA subsystem 64 also permits database editing, including revising data fields not associated with transaction data, addition and deletion of securities from market data file 58, and adjustment of transaction data to reflect dividends, stock splits and other related changes. Generally, such editing updates should be collected and applied as a group in preparation for a future trading session. Corrections messages conform to the internal protocol and are sent to message validation subsystem 56 for incorporation in market data file 58 and history file 60. Internal messages generated by DQA subsystem 64 are not subject to the validation checking procedures imposed on incoming financial data messages.

DQA subsystem 64 provides an audit log of all manual activity and maintains statistics to monitor performance at the group and individual level. Daily performance and market activity reports are created automatically. A manual interface is provided to permit setting of the message validation parameters and changing of the mode to enable or disable the validation testing by security type within each exchange. DQA subsystem 64 also provides an interface to the Exchange Definition Table to permit trading schedule modification for any of the exchanges that source financial data to the CTP system. The Exchange Definition Table is used to schedule the maintenance processes that are periodically performed on the CTP system files. Subsystem 64 also provides manual interface for the custom feeds administration function that supports the display, addition and deletion of symbols from individual custom feeds. Finally, DQA subsystem 64 provides a manual interface to market statistics management subsystem 66 that permits definition, monitoring and adjustment of the internally-calculated market statistics.

DQA subsystem 64 communicates with custom feeds management subsystem 78 on interface 96. Subsystem 78 processes DQA requests and responds to DQA subsystem 64 after feed manipulation is complete. Messages are sent and received in sequential order and interface 96 does not support priority queuing or any method of message manipulation. Messages between subsystems 64 and 78 include add/delete symbol to/from a feed, add/delete feed, and modify symbol/feed parameters.

DQA subsystem 64 communicates with market statistics calculation subsystem 66 by way of interface 102. Subsystem 64 forwards statistics manipulation messages to subsystem 66 which processes and responds following completion of the requested statistics manipulation. Message are sent and received in sequential order and interface 102 does not support priority queuing or any method of message manipulation. Interface 102 handles messages including add/delete market statistics, add/delete symbol to/from statistics, modify market statistics parameters and modify statistics value.

Custom feeds management subsystem 78 communicates with message validation subsystem 56 through interface 88. Subsystem 78 forwards feeds manipulation messages to message validation subsystem 56, which processes the requests and responds following completion of the feed manipulation. Messages sent on interface 88 are received in sequential order and interface 88 does not support priority queuing nor any method of message manipulation. The types of messages sent between subsystems 56 and 78 include add/delete symbol to/from a feed and response to add/delete symbol request.

Figure 6:
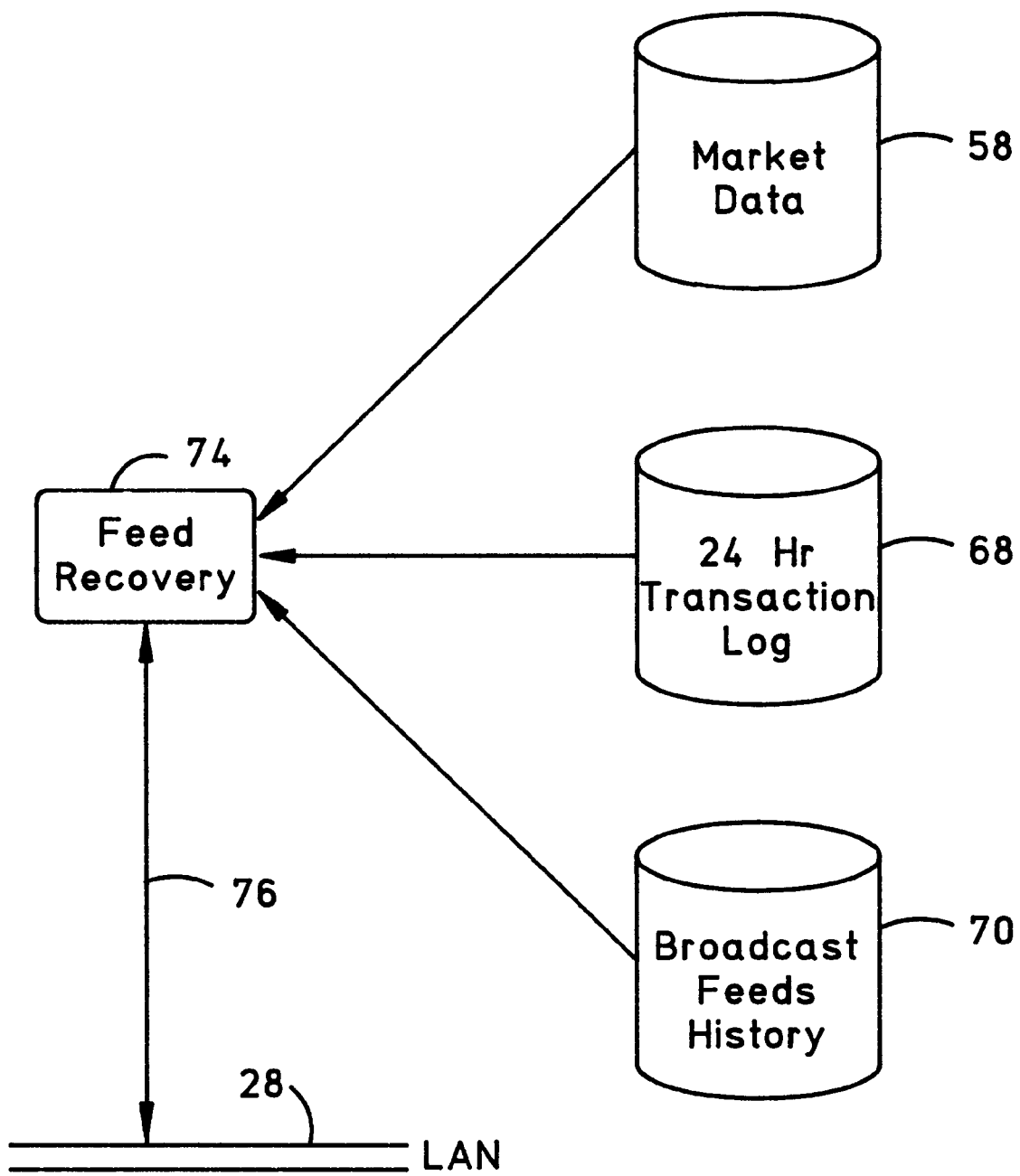
FIG. 6 is a functional block diagram illustrating the output feed recovery data flow for the CTP system of this invention.

FIG. 6 shows the feed recovery data flow for CTP 22 (FIG. 1). Feed recovery subsystem 74 processes all retransmission requests received from the underlying destination network by way of interface 76 to LAN 28. Upon receiving a retransmission request, subsystem 74 confirms that the number of concurrent retransmission requests is below a predetermined maximum, issues a message to CSS 48 (FIG. 1) asking for entitlement information and, if the request is valid, builds a retransmission-positive response and performs "last price" or "tick-by-tick" recovery depending on the request. Finally, subsystem 74 notifies the requesting destination when recovery is completed. If the request validation fails, a retransmission-negative response containing the error code is returned to the requesting receiver system. The number of concurrent retransmission sessions is a configurable system parameter. The maximum number is empirically determined and every retransmission request, source of the request, session start/end time and amount of data is logged.

A virtual connection on bus 76 is maintained separately from the normal broadcast feed on bus 26 (FIG. 2). These virtual connections remain for the duration of each recovery session, which begins with a recovery-start message sent by subsystem 74 and ends with a recovery-end message also sent by subsystem 74. Each recovery retransmission message is the same format and contains the same sequence numbers as were provided in the original broadcast feed data.

The retransmission request identifies the specific feed, the range of missed output data blocks and type of recovery desired, whether tick-by-tick or current data. For tick-bytick recovery, subsystem 74 uses data from broadcast feeds history file 70 and transaction log file 68 to reconstruct the original blocks of transaction messages and sends the blocks in sequence over interface 76 with a flag to indicate "tick-by-tick" recovery. For current data recovery, subsystem 74 uses broadcast feeds history file 70 and knowledge of the missing block range to obtain a list of symbols that were updated during the missed sequence. This "missed" symbol list is then used to obtain data for each symbol from market data file 58 and recreate current market data record summary messages for each "missed" symbol. These summary messages are transmitted on the virtual recovery circuit (interface 76) with a flag to indicate "current data" recovery. Current data recovery transmission blocks contain new block sequence numbers assigned at the time of the recovery session and have no relation to the original update transmission blocks or sequence numbers.

Figure 7:
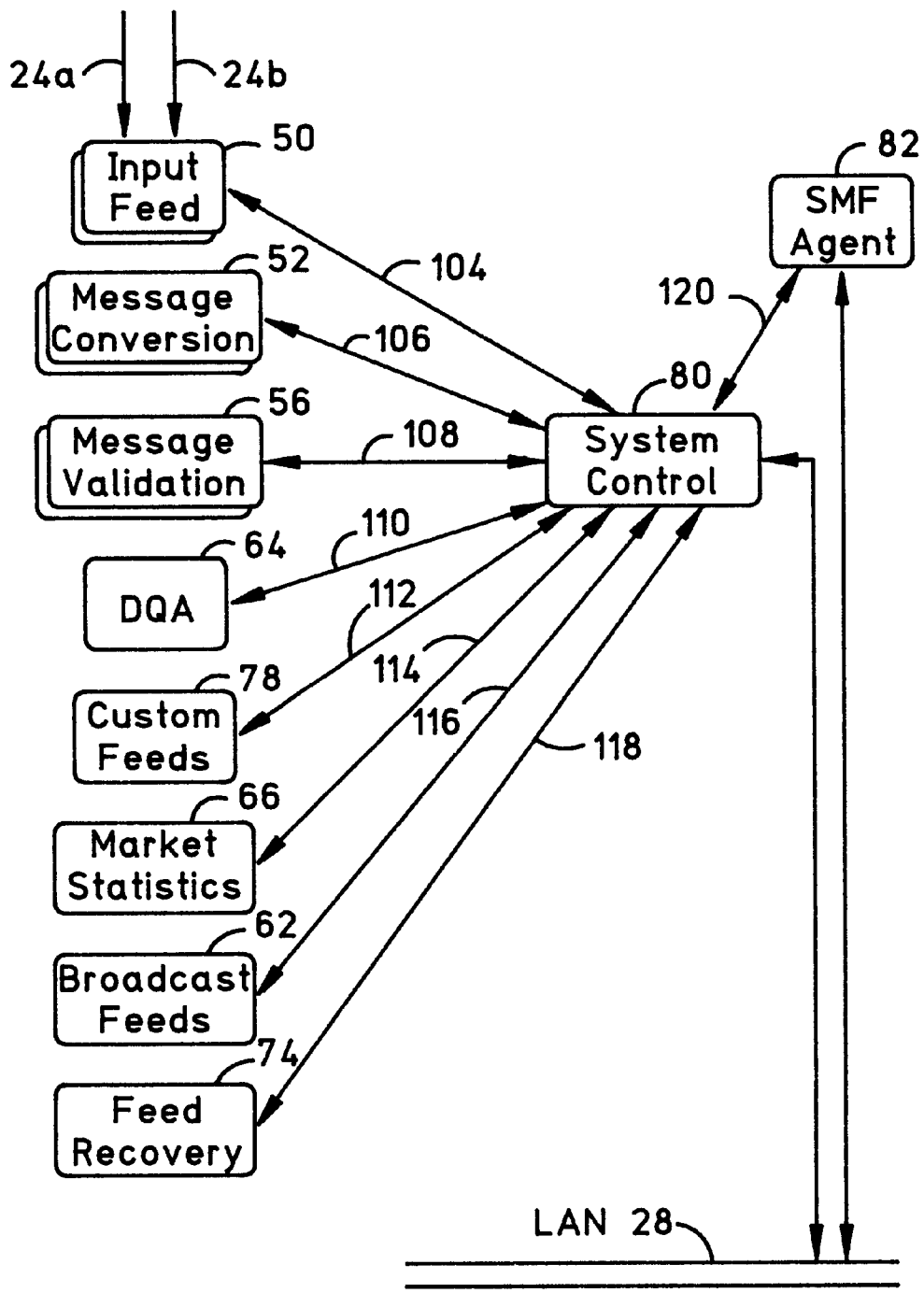
FIG. 7 is a functional block diagram illustrating the system control data flow for the CTP system of this invention.

FIG. 7 shows the system control data flow for CTP 22. System control subsystem is responsible for system configuration control, control, monitoring and administration of the tasks performed by CTP 22. The monitoring function includes periodic collection of task-specific statistics and reporting to SMF system 46 (FIG. 1) by way of SMF Agent subsystem 82. The reporting interval is configurable with a preferred value of five seconds. Subsystem 80 manages and monitors the tasks required by SMF system 46. Command messages entered at SMF 46 are received by SMF agent 82 and forwarded to system control subsystem 80 for command processing. Remote configuration messages received from SMF 46 are forwarded to a download process. Subsystem 80 also processes SMF operator commands such as get/set data structure/lists, demand specific event reporting, inquire about status, bring about a change of state, change program version, fall back to previous program version, and the like.

SMF agent subsystem 82 maintains status information regarding tasks requested by SMF 46 related to overall system supervision. Agent subsystem 82 also maintains alarm and statistics filters requested by SMF 46 responsive to alarm and statistics messages entered at SMF 46. Some examples of messages forwarded to SMF 46 by SMF agent subsystem 82 include alarm messages (e.g., indicating errors, communications problems, exceeded thresholds, etc.), informational messages indicating exceptional conditions (e.g., change in system state of health, failure to receive market-open message from exchange, etc.), and statistics messages.

System control subsystem 80 communicates with input feed subsystem 50 by way of an interface 104. The types of messages on interface 104 include load or reload software, make line primary/secondary, start/stop input feed process, modify line parameters (e.g., baud rate, etc.), and perform periodic processes (e.g., end-of-day, etc.).

Subsystem 80 communicates with message conversion subsystem 52 on an interface 106. Interface 106 messages include make input feed processes primary/secondary, modify input feed to message conversion routing, start/stop message conversion process, modify conversion table parameters (e.g., exchange indicators, etc.), modify message conversion to message validation routing, and perform periodic processes.

System control subsystem 80 communicates with message validation subsystem 56 on interface 108. The types of messages on interface 108 include start/stop validation process and perform periodic process.

System control subsystem 80 communicates with DQA subsystem 64 on an interface 110. Communications on interface 110 include those required to update the instrument/validation routing table and to report correction file 100 statistics.

System control subsystem 80 communicates with custom feeds subsystem 78 on an interface 112. Messages carried by interface 112 include add/delete feed to the feeds management table, start/stop custom feeds management process, modify feed parameters (.e.g., total bandwidth capacity, etc.) and perform periodic processes.

Subsystem 80 communicates with market statistics subsystem 66 on an interface 114. Messages carried by interface 114 include start/stop market statistics process and perform periodic processes.

Subsystem 80 communicates with broadcast feeds subsystem 62 on an interface 116. Messages on interface 116 include add/delete broadcast/point-to-point routing information, start/stop broadcast process and perform periodic processes.

Subsystem 80 interfaces with feed recovery subsystem 74 on an interface 118, which carries start/stop recovery process and modify recovery parameters (e.g., number of concurrent recoveries, etc.) messages.

Finally, subsystem 80 communicates with SMF agent subsystem 82 on an interface 120. Message types on interface 120 include command messages from SMF 46, data messages from SMF 46 (software, configuration files, etc.), alarm messages to SMF 46, statistics reporting messages to SMF 46, and status reporting to SMF 46.

Figure 8:
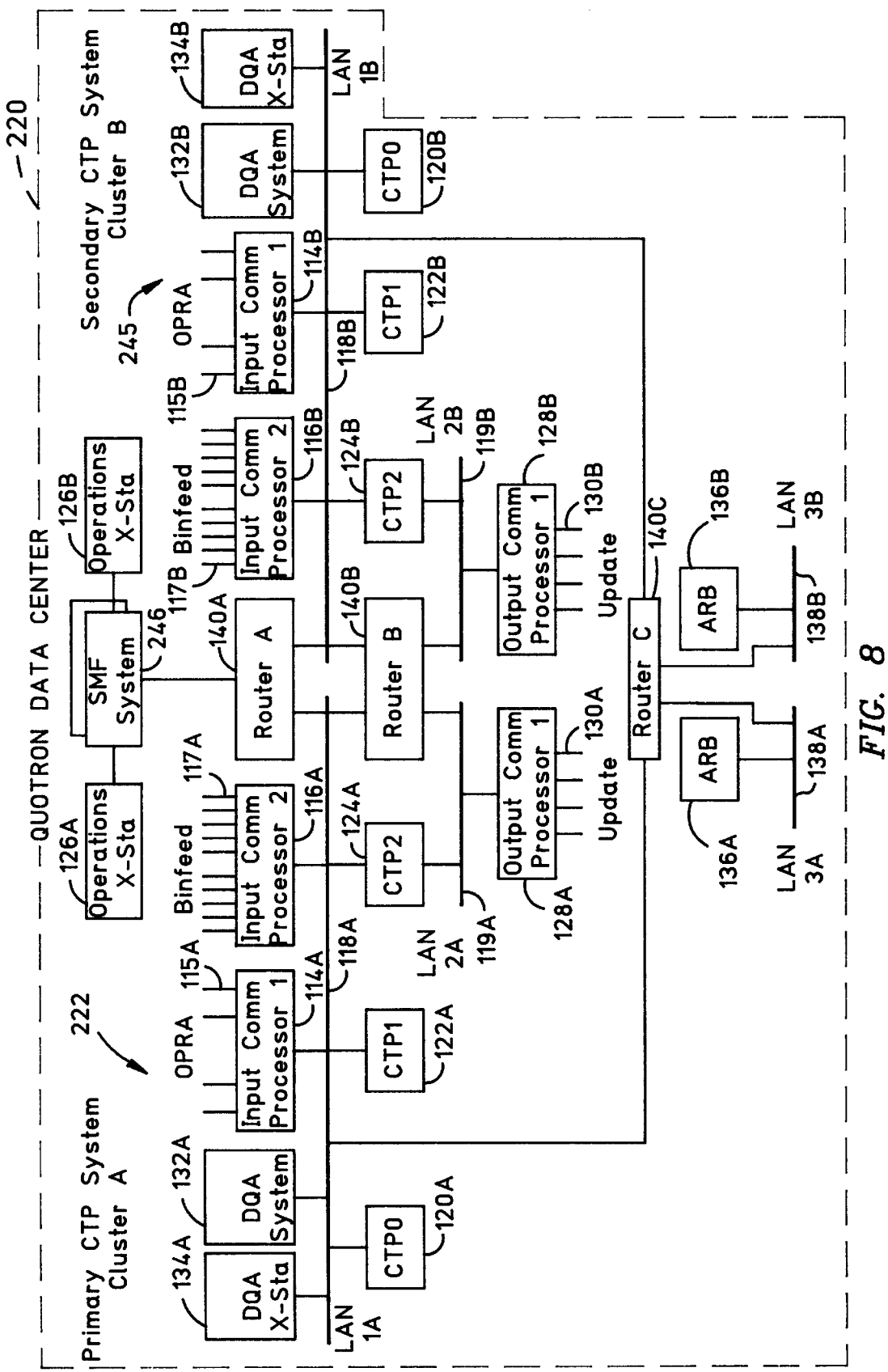
FIG. 8 is a functional block diagram showing an illustrative hardware embodiment of a financial market data center that includes the CTP system of this invention.

FIG. 8 shows an exemplary implementation of a financial market data center 220 embodying the CTP of this invention. System 220 includes a primary CTP system 222 (Cluster A) and a secondary CTP system 245 (Cluster B). Each CTP cluster includes associated support equipment such as communication processors and manual X-stations. CTPs 222 and 245 operate in duplex mode with either one functioning as primary at any time.

The primary components of each CTP are now described. The numerals designating each CTP component are modified with "A" or "B" to designate an element in CTP 222 (cluster A) or CTP 245 (cluster B). When designation of either or both is intended, the corresponding numeral is used alone without a letter appended. The components include input communication processors 114A and 116A in CTP 222 and input communication processors 114B and 116B in CTP 245. Each of these input communication processors 114 and 116 consists of Simpact Model 9000 Terminal Servers. Each processor 114 and 116 handles up to eight input lines operating at 19.2 kbps. Four OPRA lines are supplied into processor 114, exemplified by line 115. Each OPRA line operates at 19.2 kbps. Three binfeed lines exemplified by line 117 are supplied into processor 116 at the same rate. After processor 114 reads the OPRA lines and processor 116 reads the binfeed lines, each processor forwards a copy of the input messages to Local Area Network (LAN) 118 and therefrom to the Central Ticker Plant Processing Computers (CTPs) 120, 122 and 124. Each of the processors 120–124 consists of one IBM RS/6000 Model 360/550 series computer.

Processor 120 contains executables for all three CTP processors, configuration files and operator interface code. Processors 122 and 124 each retrieve the executables and configuration files from processor 120 by NFS mounting file systems and directories. Processor 120 also collects performance statistics for all three processors 120–124, drives the manual operator interface at X-station 126 and processes the binfeed line messages.

Processor 122 processes the OPRA line messages, performs input processing, validates the data and maintains the OPRA database. Also, processor 122 maintains the CTP Market Statistics Database.

Processor 124 controls data distribution and output. A CTP broadcast data output feed is delivered to the output system and update lines for transmitting to other financial market data systems are output on four lines (exemplified by line 130) operating at 14.4 kbps. Processor 124 also performs data feed recovery for the two broadcast feeds A and B (not shown) to the underlying network.

Each of the Output Communications Processors (OCPs) 128 consists of one Simpact Model 9000 Terminal Server that generates the four Update Lines exemplified by line 130 for feeding the underlying network.

Each of the DQA systems 132 consists of a single IBM RS6000 Model 360 computer coupled to at least one X-station 134 that provides the necessary manual access to the Data Quality Assurance system of this invention. The Model 360 computer 132 serves as the boot host and X-station manager for X-station 134 and contains the DQA executable code. System 132 maintains local correction logs and operator activity log files but does not mount file systems containing kickout and validation files on processors 120–124. These kickout and validation file systems are mounted by NFS. The System Management Facility (SMF) 246 provides network management and general financial market data center management functions. SMF system 246 also provides operational windows for startup, shutdown, operation and monitoring of all CTP system components, provides an arbitrator function for determining the primary/secondary state of CTPs 222 and 245, contains the Ticker Plant Configuration System for maintaining CTP configuration files and drives the configurator interface and the arbitrator interface.

Each arbitrator (ARB) 136 resides on its own dedicated LAN 138. The two ARBs are duplexed with one as the primary ARB and the other as the secondary ARB. ARBs 136A–B are a control point of CTP clusters 222 and 245, respectively, where the one Primary ARB collects state-of-health information from each of the two CTPs 222 and 245 and always knows which CTP is assigned to be the primary CTP. Upon failure in the primary CTP, the primary ARB assigns the secondary CTP to be primary and switches the primary CTP to be secondary. Data center 220 contains this pair of Arbitrators for fault-tolerance. Both ARBs 136A–B communicate with each other by sending the other state-of-health information. Upon primary Arbitrator failure, the secondary ARB will become the primary ARB.

Financial market data center 220 is organized according to a Local Area Network (LAN) architecture. There are two LANs within each CTP cluster 222 and 245. LAN 118 contains all CTP processors 120–124 and DQA system 132, input communication processors 114 and 116 and DQA X-station 134. CTP 124 is connected to a second LAN 119 and therefrom to OPC 128. SMF system 246 resides on a separate administrative LAN (not shown) to provide coupling with X-stations 126A–B and router 140A.

Routers 140A, 140B and 140C provide interconnectivity among the several LANs. Routers 140A–C are not a dedicated part of the CTP system but do form part of the financial market data center 220 architecture. Router 140C interconnects the arbitrator LANs 138A–B substantially as shown.

The CTP embodiment discussed above in connection with FIG. 8 consists mainly of several UNIX application processes that interact together to receive, process and distribute financial information. The major processing and control function embodied in system 220 are now described in terms of the particular hardware elements on which each of the processes are hosted for operation in the exemplary system environment shown in FIG. 8. The CTP architecture is modular and the processes may be relocated to accommodate growth and improved technology by updating the hardware system architecture. Therefore, the following discussion of hosted processes (FIGS. 9–12) is intended merely as an exemplary demonstration of one useful implementation of the CTP of this invention.

Figure 9:
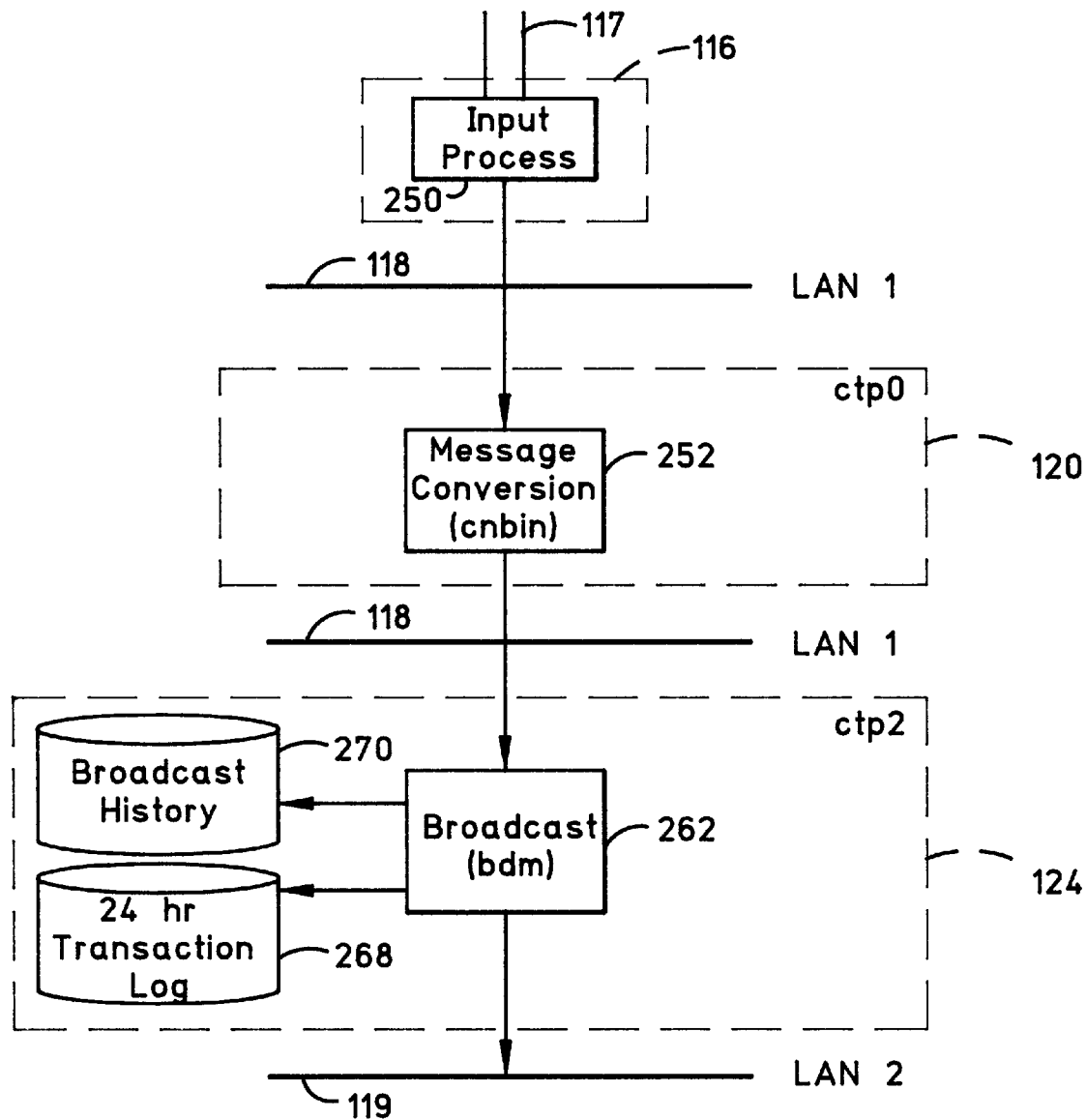
FIG. 9 is a functional block diagram showing an implementation of the input bin feed processing data flow in the exemplary CTP system embodiment of FIG. 8.

FIG. 9 shows the processing flow for data received from the binfeed input lines exemplified by line 117. The input process 250 resides in input communications processor 116 to forward input messages to LAN 118 and therefrom the CTP processor 120. The message conversion (cnbin) process 252 resides in CTP processor 120 to convert the input messages to transaction messages and to output these transaction messages to LAN 118, wherefrom they are forwarded to CTP processor 124. The broadcast (bdm) process 262 resides in CTP 124 to receive the transaction messages from LAN 118. Process 262 has access to broadcast history file 270 and transaction log file 268 within CTP 124 and assembles the transaction messages into blocks in the manner discussed above in connection with FIGS. 2–5 and forwards them to LAN 119 for distribution to the appropriate underlying network output process (not shown).

Figure 10:
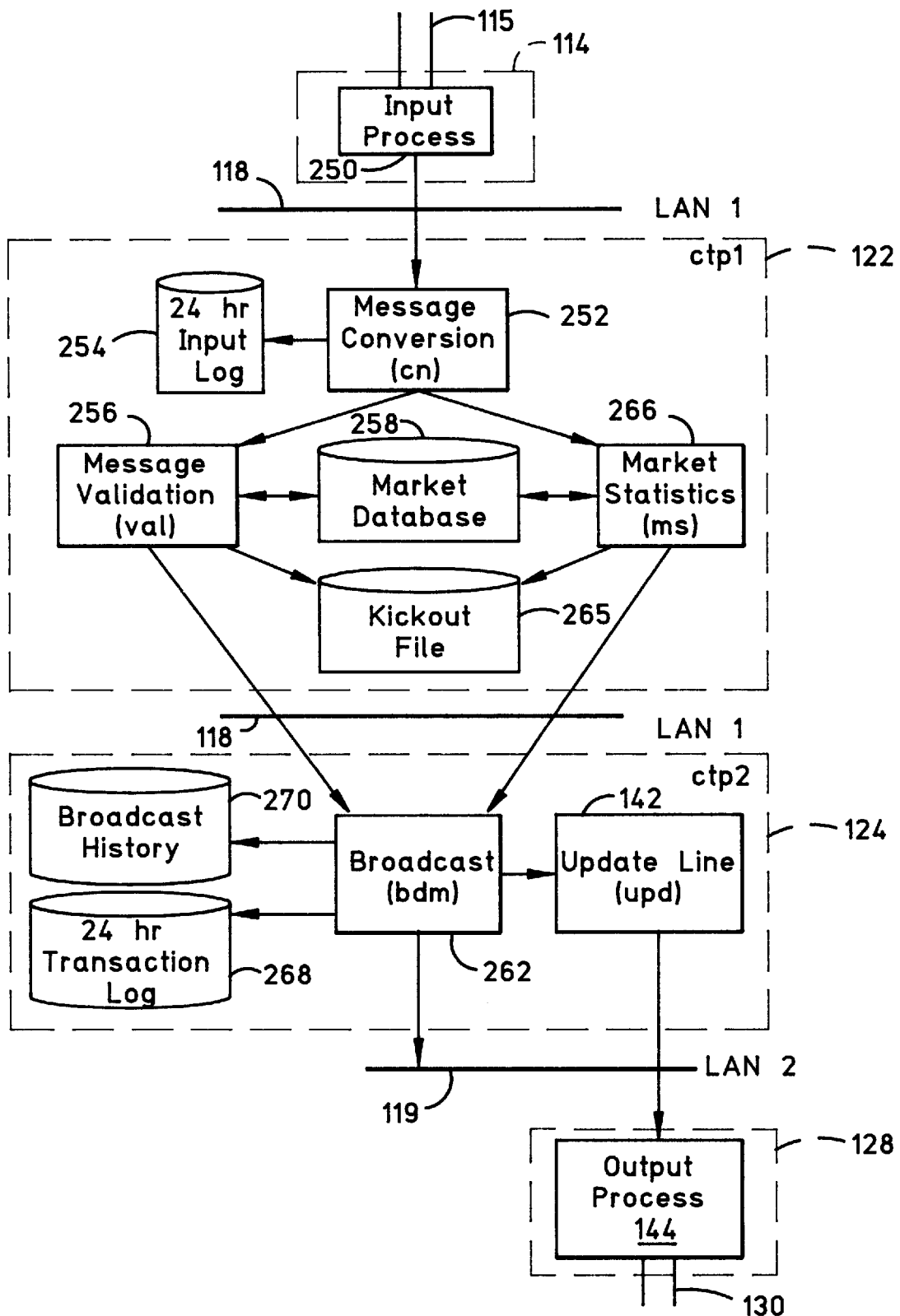
FIG. 10 is a functional block diagram showing an implementation of the Options Price Reporting Authority (OPRA) input processing data flow in the exemplary CTP system embodiment of FIG. 8.

FIG. 10 shows the processing flow for financial market data messages received from the exchanges, exemplified by the OPRA lines such as OPRA line 115. Input process 250 on input communication processor 114 receives the incoming messages and performs the validation and statistical procedures discussed above in connection with FIGS. 2–3 and 7, forwarding the annotated input messages to LAN 118. From LAN 118 the input messages are forwarded to the message conversion (cn) process 252 within processor 122 to log the messages into the input log 254 internal to processor 122. Following input message conversion to internal protocol, the internal protocol messages are forwarded to the message validation (val) process 256 and to the market statistics (ms) process 266 in processor 122. Validation process 256 and market statistics process 266 both have access to the market database file 258 and the kickout file 265 both internal to processor 122. Validation process 256 converts the internal messages to transaction messages and forwards them to LAN 118. Market statistics process 266 computes the requisite derivative data, formats it as transaction messages, and forwards it to LAN 118.

From LAN 118, the transaction messages from validation process 256 and statistics process 266 are forwarded to the broadcast (bdm) process 262 within CTP processor 124. Broadcast process 262 has access to broadcast history file 270 and transaction log file 268, both internal to processor 124. The transaction messages are accumulated into blocks and the output blocks are forwarded to second LAN 119. These same blocks now contain destination address information for routing to customer destinations in the underlying network, which is forwarded by the update line (upd) process 142 in CTP processor 124 to processor 128. Finally, the output process 144 in output communications processor 128 receives the output transaction message blocks and destination addresses from LAN 119 and formats these as serial data for transfer over to the underlying update lines exemplified by update line 130.

Figure 11:
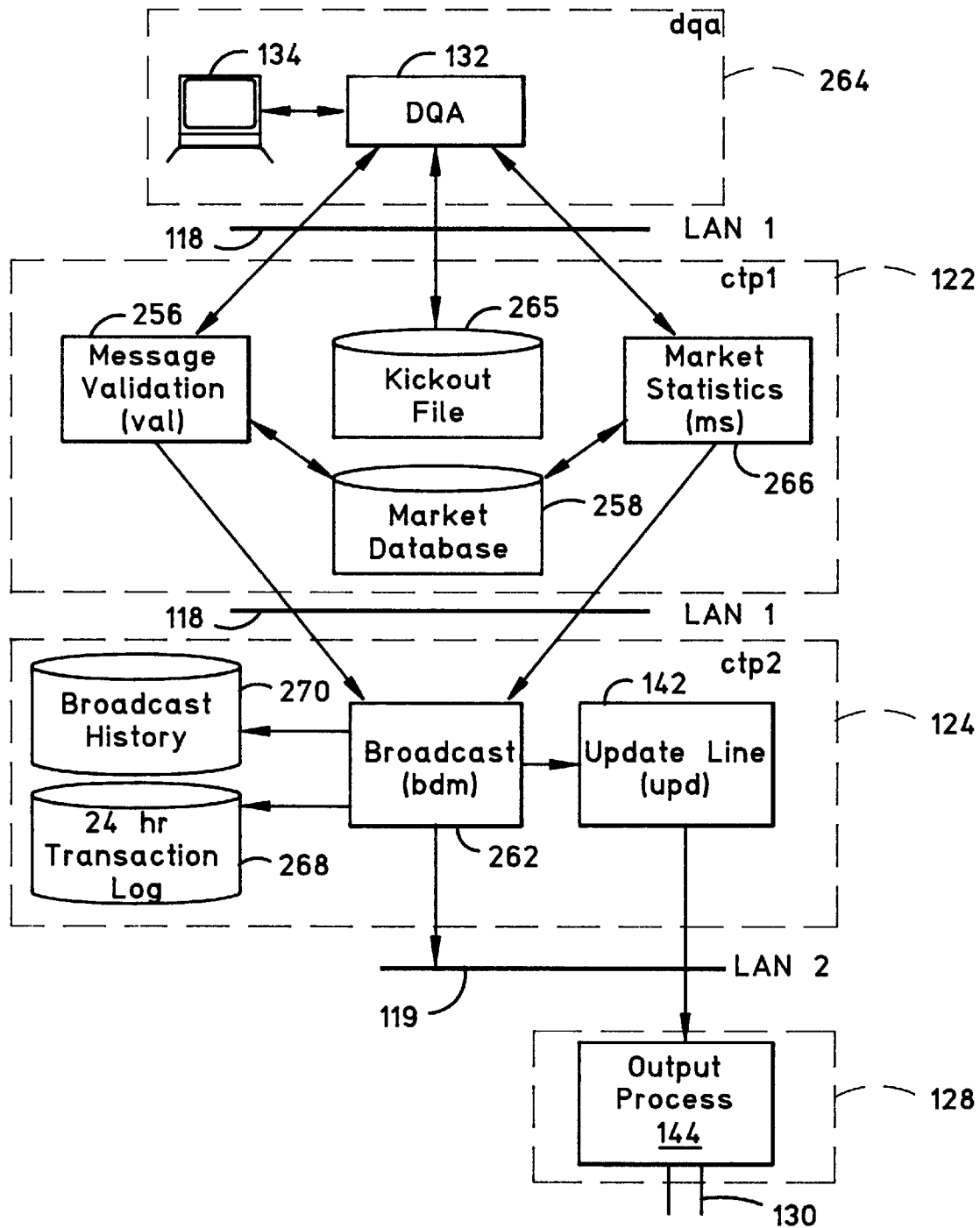
FIG. 11 is a functional block diagram showing an implementation of the DQA processing data flow in the exemplary CTP system embodiment of FIG. 8.

FIG. 11 shows the processing flow for the Data Quality Assurance (DQA) process of this invention. The DQA subsystem 264 incorporates a DQA processor 132 and a DQA X-station 134 coupled to LAN 118. DQA processor 132 retrieves exception messages and the like stored in the kickout file 265 internal to processor 122 by way of LAN 118. Manually-initiated correction messages are forwarded from DQA processor 132 to message validation (val) process 256 and market statistics (ms) process 266, both in processor 122, by way of LAN 118. Both processes 256 and 266 have access to the market database file 258 to make the necessary database updates responsive to the DQA correction messages.

Also responsive to the DQA correction messages from DQA processor 132, both processes 256 and 266 generate related transaction messages and forward them to broadcast (bdm) process 262 in processor 124 by way of LAN 118. These transaction messages (containing correction data from DQA subsystem 264) are then formatted into output blocks and forwarded to files 268 and 270 and to LAN 119 for the underlying network in the usual manner as discussed above in connection with FIG. 10.

Figure 12:
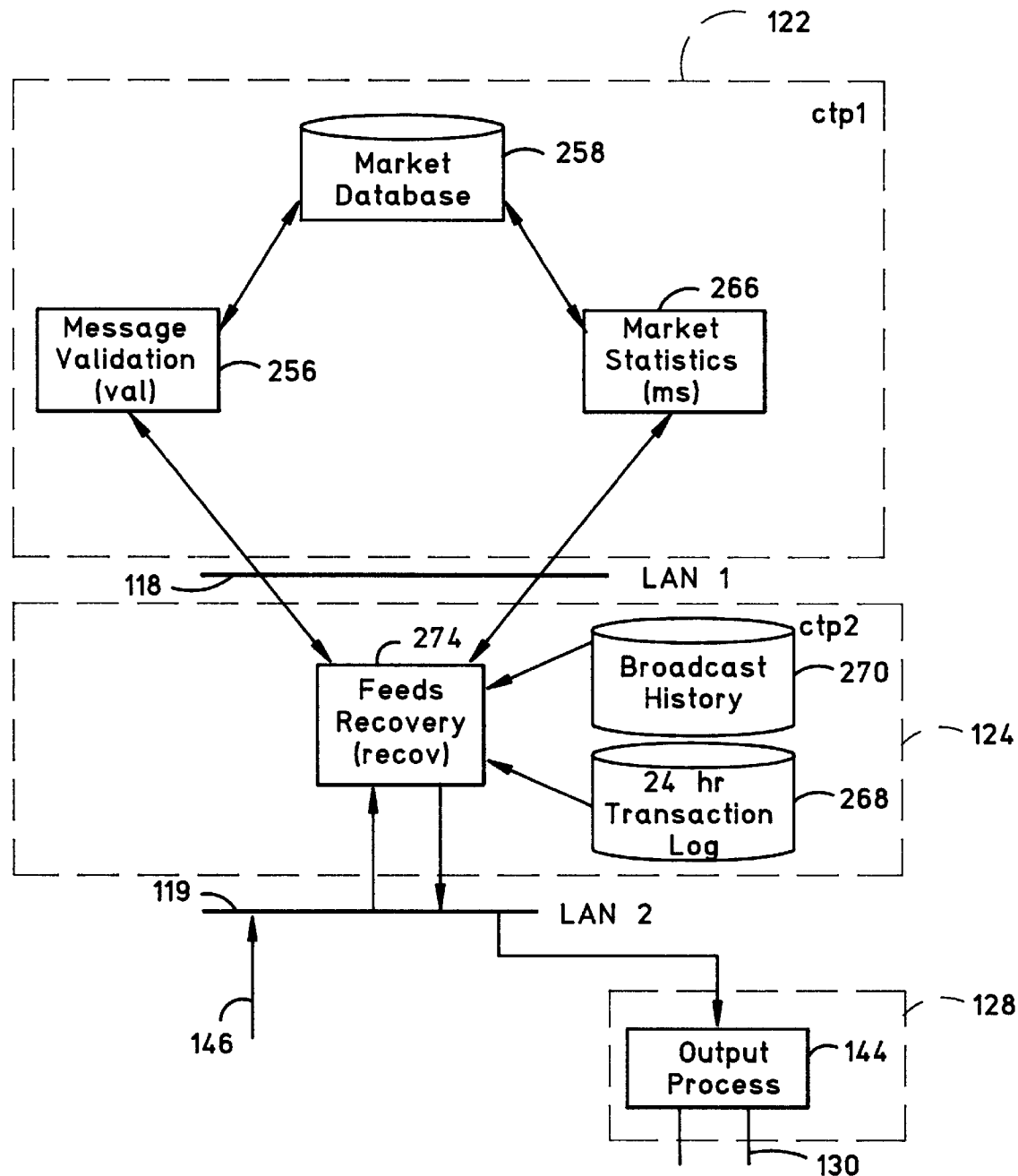
FIG. 12 is a functional block diagram showing an implementation of the retransmission recovery processing data flow in the exemplary CTP system embodiment of FIG. 8.

FIG. 12 shows the processing flow for data recovery through retransmission incorporated in the CTP of this invention. Recovery requests are received from the underlying network on line 146 coupled to LAN 119 and therefrom forwarded to the feeds recovery (recov) process 274 within processor 124 to draw the necessary blocks from the broadcast history file 270 and the transaction log file 268, both internal to processor 124. However, as discussed above in connection with FIGS. 2 and 6, process 274 must first obtain information from market database 258 within processor 122 necessary to identify which output blocks from files 268 and 270 must be retransmitted. This is accomplished through message validation (val) process 256 and market statistics (ms) process 266, both within processor 122, by way of LAN 118. Processes 256 and 266 retrieve the trading data from market database 258 necessary to identify the output blocks to be retransmitted. This information is forwarded to feeds recovery process 274 to extract and transmit the output blocks stored in files 268–270. The extracted output is forwarded to LAN 119 and therefrom to the underlying network by way of output process 144 within output communications processor 128.

Clearly, other embodiments and modifications of this invention occur readily to those of ordinary skill in the art in view of these teachings. Therefore, this invention is limited only by the following claims, which include all embodiments and modifications that are related in view of the above specification and accompanying drawing.

We claim:

1. A Central Ticker Plant (CTP) system for processing financial market data associated with a plurality of securities each belonging to a plurality of security classes, said CTP system comprising:
   a plurality of input means each for accepting input messages from a financial market data source, wherein each said input message represents financial market data according to an input message protocol;
   a plurality of message conversion means each coupled to at least one said input means for converting said each input message to an internal message representing financial market data according to an internal message protocol;
   a plurality of transaction processing means each coupled to said plurality of message conversions means for converting a plurality of said internal messages to a plurality of transaction messages associated with one of said plurality of security classes, each said transaction message representing financial market data according to a transaction message protocol;
   broadcast means coupled to said plurality of transaction processing means for duplicating each said transaction message to provide a copy for each corresponding said message destination and for producing and sending to each of a plurality of said message destinations a plurality of data blocks each including one or more said transaction messages, each such transaction message being formatted by the broadcast means in accordance with a format compatible with the destination type; and
   Data Quality Assurance (DQA) means coupled to said plurality of transaction processing means for detecting and allowing correction of error conditions in said transaction messages.

2. The CTP system of claim 1 further comprising:
   input spooling means coupled to said plurality of input means for storing each said input message in a format substantially equivalent to the corresponding said input message protocol;
   market data file means coupled to said plurality of transaction processing means for storing financial market data associated with said plurality of securities;
   kickout file means coupled to said plurality of transaction processing means for storing said transaction messages that are rejected as erroneous by said plurality of transaction processing means;
   transaction spooling means coupled to said broadcast means for storing each said transaction message in a format substantially equivalent to the corresponding said transaction message protocol;
   output spooling means coupled to said broadcast means for storing a plurality of said output data blocks produced by said broadcast means;
   market data processing means in each said transaction processing means for making changes to said financial market data stored in said market data file means responsive to each said transaction message; and
   refresh message generation means in each said transaction processing means for creating transaction messages representing existing market data for a selected plurality of said securities responsive to said market activity for said selected plurality of securities.

3. The CTP system of claim 2 further comprising:
   market statistics computing means coupled to said broadcast means and to said DQA means for computing statistical data having a predetermined protocol responsive to a sequence of said transaction messages produced during at least one predetermined contiguous time interval and for creating additional said transaction messages representing said statistical data;
   broadcast feed recovery means coupled to said output spooling means for producing and sending selected ones of said plurality of output data blocks responsive to commands from at least one said message destination; and
   custom feed management means coupled to said DQA means and to said plurality of transaction processing means for designating message destinations for selected ones of said transaction messages responsive to commands from said DQA means and responsive to commands from at least one said message destination.

4. The CTP system of claim 3 further comprising:
   envelope validation means in each said input means for marking as erroneous each said input message that does not conform to the corresponding said input message protocol;
   data field validation means in each said message conversion means for marking as erroneous each said internal message corresponding to an input message having one or more invalid data fields and for requesting retransmission of said corresponding input message by the corresponding said financial market data source;

transaction validation means in each said transaction processing means for rejecting each said transaction message that does not conform to said transaction message protocol wherein said nonconforming transaction messages include each said transaction message related to an earlier message marked as erroneous; and correction processing means in said market data processing means for creating transaction messages representing one or more said financial market data changes corresponding to at least one said input message representing a correction issued by one of said plurality of financial market data sources.

5. The CTP system of claim 4 further comprising:

input message arbitration means in each said message conversion means for discarding all but one of a plurality of identical said input messages;

custom feed list update means in each said transaction processing means for storing, in said market data file means, data representing said message destinations designated by said custom feed management means;

current recovery means in said broadcast feed recovery means for recalculating and sending current market data for each of said plurality of securities represented by said financial market data in said selected ones of said plurality of output data blocks; and ticker recovery means in said broadcast feed recovery means for resending a copy of said selected ones of said plurality of output data blocks.

6. The CTP system of claim 5 further comprising:

input line status means in each said input means for reporting statistical data representing the input message traffic conditions at said input means;

message accounting means in each said message conversion means for reporting statistical data representing the input message error conditions at said message conversion means; and exception reporting means in said DQA means for reporting all financial market data error conditions.

7. The CTP system of claim 6 further comprising:

CTP control interface means coupled to an external system management facility (SMF) for transferring data related to the manual control of said CTP system;

manual DQA interface means coupled to said DQA means for transferring data related to the manual control of said DQA means; and audit log means in said DQA means for reporting data representing each manual action represented by said data transferred through said manual DQA interface means.

8. The CTP system of claim 3 further comprising:

input message arbitration means in each said message conversion means for discarding all but one of a plurality of identical said input messages;

custom feed list update means in each said transaction processing means for storing in said market data file means, data representing said message destinations designated by said custom feed management means;

current recovery means in said broadcast feed recovery means for recalculating and sending current market data for each of said plurality of securities represented by said financial market data in said selected ones of said plurality of output data blocks; and ticker recovery means in said broadcast feed recovery means for resending a copy of said selected ones of said plurality of output data blocks.

9. The CTP system of claim 1 further comprising:

envelope validation means in each said input means for marking as erroneous each said input message that does not conform to the corresponding said input message protocol;

data field validation means in each said message conversion means for marking as erroneous each said internal message corresponding to an input message having one or more invalid data fields and for requesting retransmission of said corresponding input message by the corresponding said financial market data source;

transaction validation means in each said transaction processing means for rejecting each said transaction message that does not conform to said transaction message protocol wherein said nonconforming transaction messages include each said transaction message related to an earlier message marked as erroneous; and correction processing means in said market data processing means for creating transaction messages representing one or more said financial market data changes corresponding to at least one said input message representing a correction issued by one of said plurality of financial market data sources.

10. The CTP system of claim 1 further comprising:

market statistics computing means coupled to said broadcast means and to said DQA means for computing statistical data having a predetermined protocol responsive to a sequence of said transaction messages produced during at least one predetermined contiguous time interval and for creating additional said transaction messages representing said statistical data;

broadcast feed recovery means coupled to said output spooling means for producing and sending selected ones of said plurality of output data blocks responsive to commands from at least one said message destination; and custom feed management means coupled to said DQA means and to said plurality of transaction processing means for designating message destinations for selected ones of said transaction messages responsive to commands from said DQA means and responsive to commands from at least one said message destination.

11. The Central Ticker Plant of claim 1, wherein each said transaction message includes data specifying one or more message destinations.

12. A financial data processing system for processing financial market data associated with a plurality of securities each belonging to at least one of a plurality of security classes, said system having redundant financial data processing means including first and second central ticker plants, each said central ticker plant (CTP) having an active status and a standby status, and said financial data processing system further having assignor means for switching said first central ticker plant from said active status to said standby status and for switching said second central ticker plant from said standby status to said active status, whereby operation of said financial data processing system continues without interruption upon failure of said first central ticker plant, wherein said first and second central ticker plants each comprise:

a plurality of input means each for accepting input messages from a financial market data source, wherein each said input message represents financial market data according to an input message protocol;

a plurality of message conversion means each coupled to at least one said input means for converting said each input message to an internal message representing financial market data according to an internal message protocol;

a plurality of transaction processing means each coupled to said plurality of message conversions means for converting a plurality of said internal messages to a plurality of transaction messages associated with one of said plurality of security classes, each said transaction message representing financial market data according to a transaction message protocol, wherein each said transaction message includes data specifying one or more message destinations;

broadcast means coupled to said plurality of transaction processing means for duplicating each said transaction message to provide a copy for each corresponding said message destination and for producing and sending to each of a plurality of said message destinations a plurality of data blocks each including one or more said transaction messages each such transaction message being formatted by the broadcast means in accordance with a format compatible with the destination type; and Data Quality Assurance (DQA) means coupled to said plurality of transaction processing means for detecting and allowing correction of error conditions in said transaction messages.

13. The financial data processing system of claim 12 wherein said first and second central ticker plants each further comprise:

input spooling means coupled to said plurality of input means for storing each said input message in a format substantially equivalent to the corresponding said input message protocol;

market data file means coupled to said plurality of transaction processing means for storing financial market data associated with said plurality of securities;

kickout file means coupled to said plurality of transaction processing means for storing said transaction messages that are rejected as erroneous by said plurality of transaction processing means;

transaction spooling means coupled to said broadcast means for storing each said transaction message in a format substantially equivalent to the corresponding said transaction message protocol;

output spooling means coupled to said broadcast means for storing a plurality of said output data blocks produced by said broadcast means;

market data processing means in each said transaction processing means for making changes to said financial market data stored in said market data file means responsive to each said transaction message; and refresh message generation means in each said transaction processing means for creating transaction messages containing existing market data for a selected plurality of said securities responsive to said market activity for said selected plurality of securities.

14. The financial data processing system of claim 12 wherein said first and second central ticker plants each further comprise:

market statistics computing means coupled to said broadcast means and to said DQA means for computing statistical data having a predetermined protocol responsive to a sequence of said transaction messages produced during at least one predetermined contiguous time interval and for creating additional said transaction messages representing said statistical data;

broadcast feed recovery means coupled to said output spooling means for producing and sending selected ones of said plurality of output data blocks responsive to commands from at least one said message destination; and custom feed management means coupled to said DQA means and to said plurality of transaction processing means for designating message destinations for selected ones of said transaction messages responsive to commands from said DQA means and responsive to commands from at least one said message destination.

15. The financial data processing system of claim 12 wherein said first and second central ticker plants each further comprise:

envelope validation means in each said input means for marking as erroneous each said input message that does not conform to the corresponding said input message protocol;

data field validation means in each said message conversion means for marking as erroneous each said internal message corresponding to an input message having one or more invalid data fields and for requesting retransmission of said corresponding input message by the corresponding said financial market data source;

transaction validation means in each said transaction processing means for rejecting each said transaction message that does not conform to said transaction message protocol wherein said nonconforming transaction messages include each said transaction message related to an earlier message marked as erroneous; and correction processing means in said market data processing means for creating transaction messages representing one or more said financial market data changes corresponding to at least one said input message representing a correction issued by one of said plurality of financial market data sources.

16. The financial data processing system of claim 12 wherein said first and second central ticker plants each further comprise:

input message arbitration means in each said message conversion means for discarding all but one of a plurality of identical said input messages;

custom feed list update means in each said transaction processing means for storing, in said market data file means, data representing said message destinations designated by said custom feed management means;

current recovery means in said broadcast feed recovery means for recalculating and sending current market data for each of said plurality of securities represented by said financial market data in selected ones of said plurality of output data blocks; and ticker recovery means in said broadcast feed recovery means for resending a copy of said selected ones of said plurality of output data blocks.

17. The financial data processing system of claim 12 wherein said first and second central ticker plants each further comprise:

input line status means in each said input means for reporting statistical data representing the input message traffic conditions at said input means;

message accounting means in each said message conversion means for reporting statistical data representing the input message error conditions at said message conversion means; and exception reporting means in said DQA means for reporting all financial market data error conditions.

18. The financial data processing system of claim 12 wherein said first and second central ticker plants each further comprise:

CTP control interface means coupled to an external system management facility (SMF) for transferring data related to the manual control of said CTP system;

manual DQA interface means coupled to said DQA means for transferring data related to the manual control of said DQA means; and audit log means in said DQA means for reporting data representing each manual action represented by said data transferred through said manual DQA interface means.

\* \* \* \* \*